United States Patent
Lee et al.

(10) Patent No.: US 12,096,064 B2
(45) Date of Patent: Sep. 17, 2024

(54) DISPLAY DEVICE AND METHOD FOR OPERATING SAME

(71) Applicant: LG ELECTRONICS INC., Seoul (KR)

(72) Inventors: Hyeseung Lee, Seoul (KR); Eunyoung Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 15 days.

(21) Appl. No.: 17/788,634

(22) PCT Filed: Dec. 23, 2019

(86) PCT No.: PCT/KR2019/018315
§ 371 (c)(1),
(2) Date: Jun. 23, 2022

(87) PCT Pub. No.: WO2021/132738
PCT Pub. Date: Jul. 1, 2021

(65) Prior Publication Data
US 2023/0035751 A1 Feb. 2, 2023

(51) Int. Cl.
*H04N 21/422* (2011.01)
*G06F 3/16* (2006.01)
*G10L 15/22* (2006.01)

(52) U.S. Cl.
CPC ....... *H04N 21/42203* (2013.01); *G06F 3/167* (2013.01); *G10L 15/22* (2013.01); *G10L 2015/223* (2013.01)

(58) Field of Classification Search
CPC .... H04N 21/42203; G06F 3/167; G10L 15/22
See application file for complete search history.

(56) References Cited

U.S. PATENT DOCUMENTS

| | | | |
|---|---|---|---|
| 2012/0297400 A1* | 11/2012 | Hill | G06F 9/445 719/318 |
| 2013/0347018 A1 | 12/2013 | Limp et al. | |
| 2014/0165105 A1* | 6/2014 | Mountain | H04N 21/8456 725/46 |
| 2015/0189362 A1 | 7/2015 | Lee et al. | |

(Continued)

FOREIGN PATENT DOCUMENTS

| | | |
|---|---|---|
| KR | 10-2015-0044474 A | 4/2015 |
| KR | 10-2016-0004739 A | 1/2016 |

(Continued)

OTHER PUBLICATIONS

International Search Report for PCT/KR2019/018315 mailed on Sep. 17, 2020.

*Primary Examiner* — Mulugeta Mengesha
(74) *Attorney, Agent, or Firm* — Birch, Stewart, Kolasch & Birch, LLP

(57) ABSTRACT

A display device according to the present disclosure may comprise: a display which displays a content; and a controller which, upon receiving a voice command, controls the display to display content-related information corresponding to a scene at the time of receiving the voice command, wherein the controller may change arrangement of the content-related information on the basis of a category requested by the voice command.

18 Claims, 22 Drawing Sheets

(56) References Cited

U.S. PATENT DOCUMENTS

| | | | |
|---|---|---|---|
| 2015/0373428 A1* | 12/2015 | Trollope | G10L 15/26 |
| | | | 704/235 |
| 2018/0025405 A1 | 1/2018 | Jones et al. | |
| 2020/0134320 A1* | 4/2020 | Crossley | G06F 9/451 |
| 2021/0152870 A1* | 5/2021 | Lee | H04N 21/47217 |
| 2021/0321166 A1* | 10/2021 | Jeong | H04N 21/44008 |

FOREIGN PATENT DOCUMENTS

| | | |
|---|---|---|
| KR | 10-2016-0084059 A | 7/2016 |
| KR | 10-2018-0082950 A | 7/2018 |

* cited by examiner (a)

(b)

(c)

(a)

(b)

(a)

(b)

(a)

(b)

(a)

(b)

(a)

(b)

(a)

(b)

(a)

(b)

(a)

(b)

(a)

(b)

DISPLAY DEVICE AND METHOD FOR OPERATING SAME

CROSS REFERENCE TO RELATED APPLICATION

This application is the National Phase of PCT International Application No. PCT/KR2019/018315, filed on Dec. 23, 2019, which is hereby expressly incorporated by reference into the present application.

TECHNICAL FIELD

The present disclosure relates to a display device and a method for operating the same.

BACKGROUND ART

Recently, a digital TV service using a wired or wireless communication network has come into wide use. The digital TV service may provide various services which cannot be provided by an existing analog broadcast service.

For example, an Internet protocol television (IPTV) service or a smart TV service which is a digital TV service provides interactivity for enabling a user to actively select a type of a program to be viewed, a viewing time, etc. The IPTV service or the smart TV service may provide various additional services, e.g., Internet search, home shopping, online games, etc. based on such interactivity.

When a user views the content, the user may have questions about products, characters, locations, etc. appearing in the content. In this case, it is inconvenient for the user to manually search for products, characters, locations, etc. appearing in the content by using the Internet or the like. Also, it may be difficult for a user to search products, characters, or locations that matches the one appearing in the content, even if the user searches for products, characters, locations, etc. appearing in the content one by one.

Thus, there may be a need for a method for automatically providing information about a product, characters, or location related to the content that is currently viewing by the user. Particularly, when there is a user's request for content-related information, a method for more accurately providing information meeting the user's request may be required.

DISCLOSURE OF THE INVENTION

Technical Problem

An object of the present disclosure is to provide a display device that provides information corresponding to a user's request more quickly and preferentially when providing content-related information, and an operating method thereof.

An object of the present disclosure is to provide a display device that more accurately provides information corresponding to a user's request when providing content-related information, and an operating method thereof.

Technical Solution

A display device according to the present disclosure includes a display configured to display a content and a controller configured to control the display to display content-related information corresponding to a scene at a time point, at which a voice command is received, when the voice command is received, wherein the controller may change an arrangement of the content-related information on the basis of a category requested by the voice command.

The controller may be configured to change the arrangement of the content-related information so that the information corresponding to the requested category is displayed in priority order rather than other information.

When the content-related information comprises information corresponding to a first category and information corresponding to a second category, if the requested category is the first category, the display may be configured to display the information corresponding to the first category in priority order rather than the information corresponding to the second category.

When the information corresponding to the requested category does not exist in the content-related information, the controller may be configured to control the display so that other information other than the information corresponding to the requested category are displayed.

When the information corresponding to the requested category does not exist in the content-related information, the controller may be configured to determine whether information corresponding to other categories other than the requested category exist in the content-related information.

When information corresponding to other categories other than the requested category exists in the content-related information, the controller may be configured to control the display so that the information corresponding to the other categories is displayed.

When the information corresponding to the requested category does not exist in the content-related information, the controller may be configured to determine whether the information corresponding to the requested category exists on a previous scene before receiving the voice command.

When the information corresponding to the requested category exists on the scene before receiving the voice command, the controller may be configured to control the display so that the information corresponding to the requested category comprised in the previous scene is displayed.

When the information corresponding to the requested category does not exist in the content-related information, the controller may be configured to control the display so that all of the content-related information comprised in the content is displayed.

When the voice command for requesting the content-related information is received, the controller may be configured to acquire the content-related information that is metadata including a category.

The category may include at least one of a location, a product, a character, and others.

The content-related information may include categories corresponding to a frame time for each of a plurality of frames constituting the content.

When the content-related information is displayed, the controller may be configured to control the display so that an image captured at a time point, at which the voice command is received, is further displayed.

The controller may be configured to acquire the requested category based on the voice command.

The controller may be configured to determine an order in which the content-related information is displayed based on the requested category.

Advantageous Effects

According to the present disclosure, since the display device displays the information corresponding to the category requested by the user in the priority order, there may be the advantage in that it is possible to provide the user's convenience to quickly acquire the desired information.

According to the present disclosure, if the information corresponding to the category requested by the user does not exist, since the display device displays the information of another category or the information corresponding to the requested category contained in the previous scene, there may be the advantage of more accurately providing the information desired by the user.

According to the present disclosure, since the display device displays the captured image together when displaying the content-related information, there may be the advantage that the user easily checks which scene the displayed content-related information is related to the content-related information.

According to the present disclosure, there may be an advantage in that the display device uses the content-related information that is the metadata including the category to more accurately provide the information corresponding to the category.

MODE FOR CARRYING OUT THE INVENTION

Hereinafter, embodiments relating to the present disclosure will be described in detail with reference to the accompanying drawings. The suffixes "module" and "interface" for components used in the description below are assigned or mixed in consideration of easiness in writing the specification and do not have distinctive meanings or roles by themselves.

Figure 1:
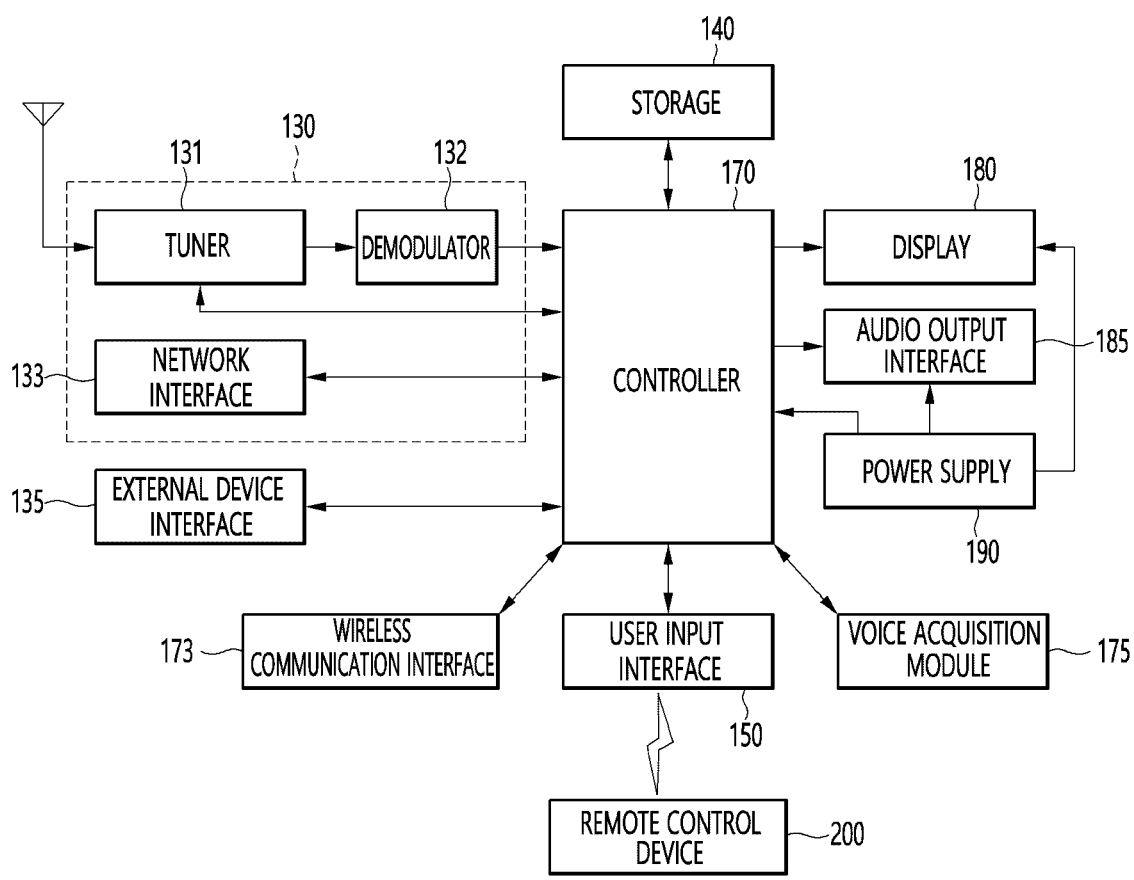
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception module 130, an external device interface 135, a storage 140, a user input interface 150, a controller 170, a wireless communication interface 173, a voice acquisition module 175, a display 180, an audio output interface 185, and a power supply 190.

The broadcast reception module 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The network interface 133 can provide an interface for connecting the display device 100 to a wired/wireless network including internet network. The network interface 133 can transmit or receive data to or from another user or another electronic device through an accessed network or another network linked to the accessed network.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 135 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The voice acquisition module 175 can acquire audio. The voice acquisition module 175 may include at least one microphone (not shown), and can acquire audio around the display device 100 through the microphone (not shown).

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present disclosure described below can be performed by one of the display device described with reference to FIG. 1, an image processing device such as the separated set-top box, and a content playback device including the display 180 and the audio output interface 185.

The audio output interface 185 receives the audio processed signal from the controller 170 and outputs the sound.

The power supply 190 supplies the corresponding power throughout the display device 100. In particular, the power supply 190 supplies power to the controller 170 that can be implemented in the form of a System On Chip (SOC), a display 180 for displaying an image, and the audio output interface 185 for outputting audio or the like.

Specifically, the power supply 190 may include a converter for converting an AC power source into a DC power source, and a DC/DC converter for converting a level of the DC source power.

Figure 2:
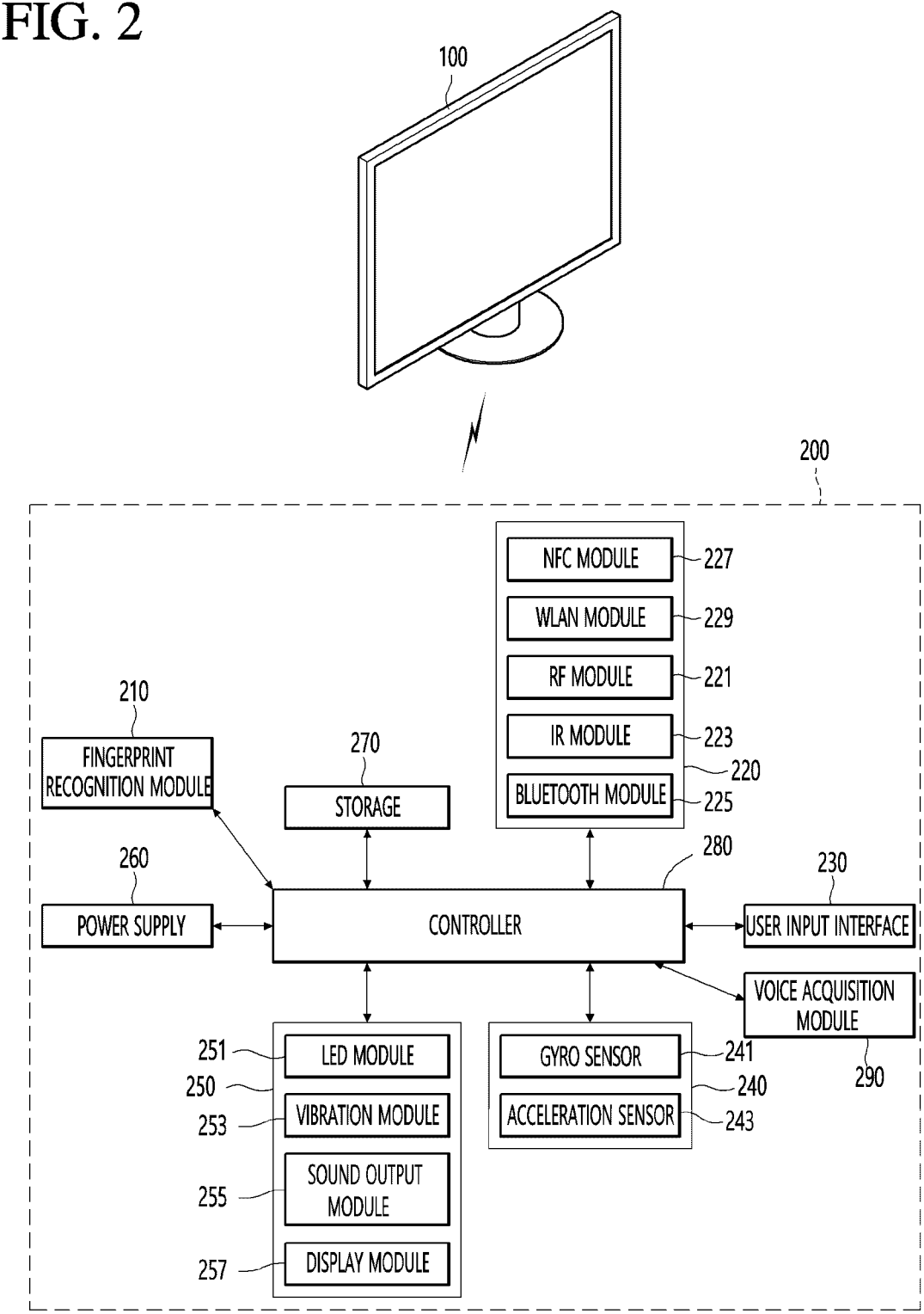
FIG. 2 is a block diagram illustrating a remote control device according to an embodiment of the present disclosure.
Figure 3:
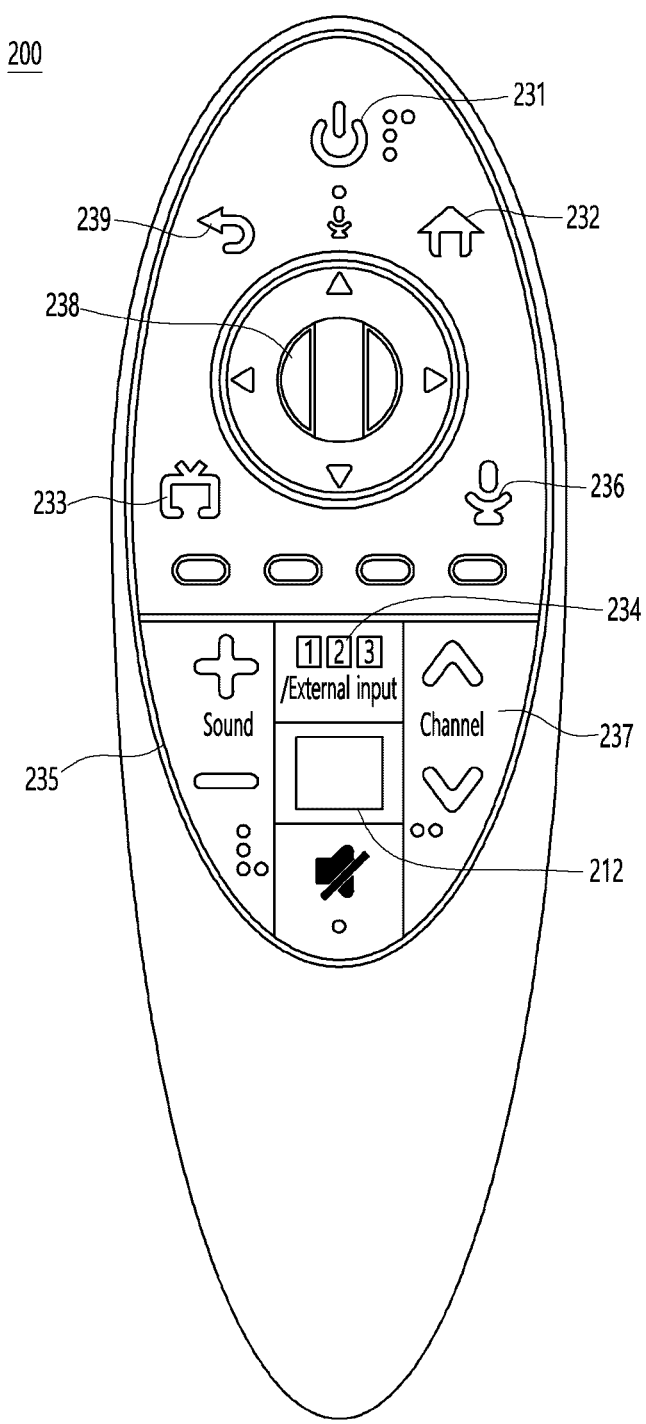
FIG. 3 is a view illustrating an actual configuration of the remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition module 210, a wireless communication interface 220, a user input interface 230, a sensor 240, an output interface 250, a power supply 260, a storage 270, a controller 280, and a voice acquisition module 290.

Referring to FIG. 2, the wireless communication interface 220 transmits/receives signals to/from an arbitrary any one of display devices according to the above-mentioned embodiments of the present disclosure.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output interface 250 can output image or voice signals corresponding to a manipulation of the user input interface 230 or corresponding to signals transmitted from the display device 100. A user can recognize whether the user input interface 230 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input interface 230 or a signal corresponding to a movement of the remote control device 200 sensed by the sensor 240 to the display device 100 through the wireless communication interface 220.

Additionally, the voice acquisition module 290 of the remote control device 200 can obtain voice.

The voice acquisition module 290 can include at least one microphone 291 and obtain voice through the microphone 291.

Figure 4:
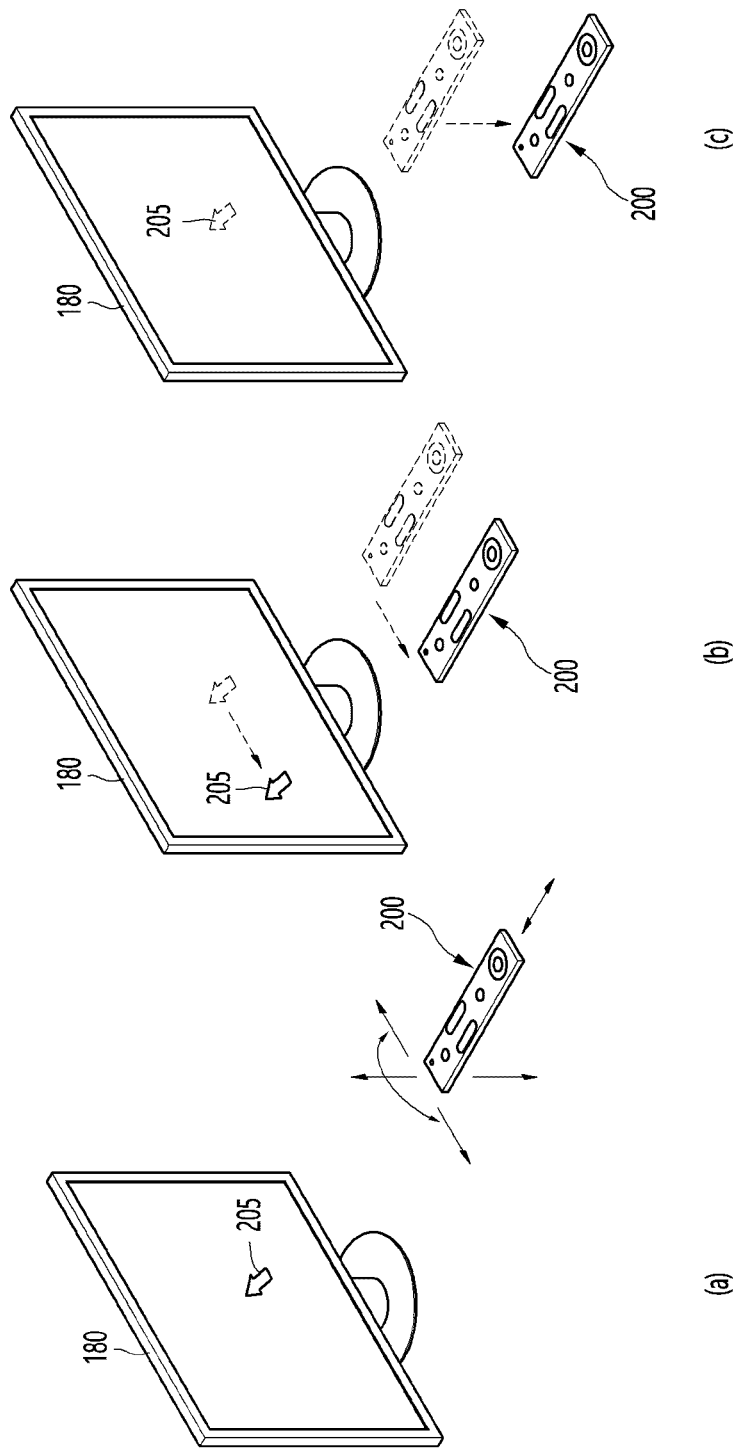
FIG. 4 is a view illustrating an example of utilizing a remote control device according to an embodiment of the present disclosure.

Then, FIG. 4 is described.

FIG. 4 is a view of utilizing a remote control device according to an embodiment of the present disclosure.

FIG. 4A illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display 180. Thus, a selection area in the display 180 corresponding to the pointer 205 can be zoomed in and displayed largely.

On the other hand, if a user moves the remote control device 200 close to the display 180, a selection area in the display 180 corresponding to the pointer 205 can be zoomed out and displayed reduced.

On the other hand, if the remote control device 200 is away from the display 180, a selection area can be zoomed out and if the remote control device 200 is close to the display 180, a selection area can be zoomed in.

Additionally, if a specific button in the remote control device 200 is pressed, the recognition of a vertical or horizontal movement can be excluded. That is, if the remote control device 200 is moved away from or close to the display 180, the up, down, left, or right movement may not be recognized and only the back and fourth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

The display device 100 may provide information related to a content being displayed. For example, the display device 100 may provide information related to a content by displaying the information related to the content being displayed on the display 180 or outputting the information through the audio output interface 185. However, a method for providing information related to content is not limited to the above-described method and may be more diverse.

The display device 100 may provide information related to a content that is being currently viewed by the user.

Hereinafter, for convenience of description, the information related to the content is referred to as content-related information.

The content-related information may refer to information about products, characters, locations, or music appearing in the content. The content-related information may include information about products, characters, locations, or music similar to those appearing in the content, as well as the information about products, characters, locations, or music appearing in the content.

When providing the content-related information, the display device 100 may provide content-related information related to a current scene among the content-related information. That is, the display device 100 may provide information on products, characters, locations, or music related to a scene that is currently viewed by the user. As a result, the display device 100 may immediately provide information that the user is curious about while watching the content.

The user wants to know information about music appearing in the current scene, but information other than music such as products, characters, or locations may be provided first in the display device 100. In this case, the user may have to wait until the desired information is provided or may cause inconvenience in having to separately input the desired information to search the desired information.

Thus, the display device 100 according to the present disclosure preferentially provides information desired by the user when providing the content-related information.

Figure 5:
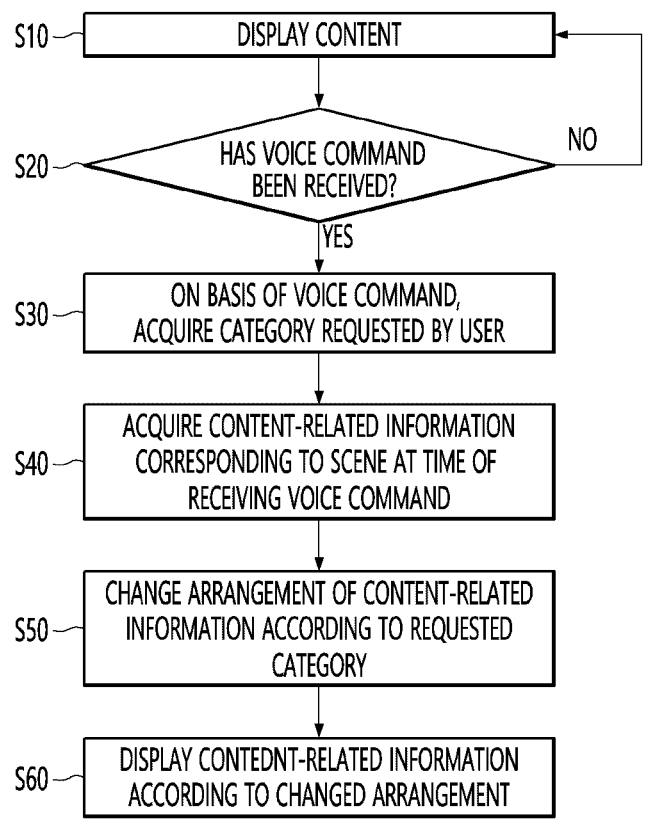
FIG. 5 is a flowchart illustrating a method for operating a display device according to an embodiment of the present disclosure.

FIG. 5 is a flowchart illustrating a method for operating a display device according to an embodiment of the present disclosure.

A controller 170 may display a content (S10).

The controller 170 may display the content on a display 180. In this case, the content may be a broadcast image received through a broadcast reception module 130.

However, this is merely an example, and the content may include an image received from an external device such as a set-top box or a smartphone, an image reproduced through an application, and the like.

The controller 170 may determine whether a voice command has been received when displaying the content (S20).

In this case, the voice command may be a command for requesting content-related information. That is, the controller 170 may determine whether the command for requesting the content-related information is received when displaying the content.

The user may request the content-related information from the display device 100 by voice through a voice acquisition module 175 provided in the display device 100 or a voice acquisition module 290 provided in the remote control device 200. Thus, the controller 170 may receive a command for requesting the content-related information through the voice acquisition module 175 or the user input interface 150.

When the controller 170 does not receive the voice command, the controller 170 may continuously display the content.

When receiving the voice command, the controller 170 may acquire a category requested by the user based on the voice command (S30).

The requested category may mean a category of the content-related information requested by the user through the voice command. For example, the category may include characters, fashion products, other products, locations, music, and the like, but this is merely an example, and the types of category may vary. The category may be divided into detailed categories. For example, the character category may have detailed categories such as men, women, adults, children, etc., and the fashion product category may have detailed categories such as clothes, shoes, pants, etc., but this is merely an example and is not limited thereto.

According to an embodiment, the controller 170 may acquire the category requested by the user by internally analyzing the voice command. For example, the controller 170 may acquire the category requested by the user by extracting a preset keyword from the voice command. However, this is merely an example and is not limited thereto.

Figure 6:
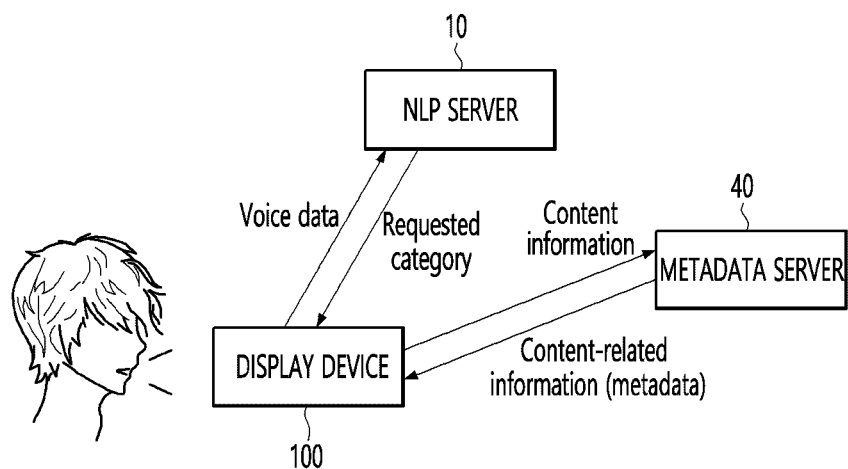
FIG. 6 is a schematic view illustrating an example of a method for acquiring a required category and content-related information through a display device according to an embodiment of the present disclosure.

According to another embodiment, the controller 170 may acquire the category requested by the user through an external server (e.g., an NLP server 10 of FIG. 6). This will be described with reference to FIG. 6.

Then, the controller 170 may acquire content-related information corresponding to a scene at a time point at which the voice command is received (S40).

The controller 170 may acquire content-related information corresponding to a scene at the time point, at which the voice command is received, among the content-related information. In this case, the scene at the time point, at which the voice command is received, may include only the scene being displayed at the time point, at which the voice command is received, or the scene being displayed at the time point, at which the voice command is received, and scenes for a predetermined time before receiving the voice command. Thus, the controller 170 may acquire the content-related information corresponding to the scene at the time point, at which the voice command is received. Alternatively, the controller 170 may acquire content-related information about the scene at the time point, at which the voice command is received, and the scenes for a predetermined time before receiving the voice command.

The content-related information may be metadata including a category. When receiving the voice command for requesting the content-related information, the controller 170 may acquire content-related information that is metadata including a category.

The controller 170 may acquire content-related information through an external server (e.g., the metadata server 40 of FIG. 6). This will be described with reference to FIG. 6.

An order of processes S30 and S40 may be changed. That is, when receiving the voice command, the controller 170 may acquire the content-related information corresponding to the scene at the time point, at which the voice command is received, and then acquire the category requested by the user. Also, when receiving the voice command, the controller 170 may simultaneously acquire the content-related information corresponding to the scene at the time point, at which the voice command is received, and the category requested by the user.

When the controller 170 acquires the requested category and the content-related information according to the voice command, an arrangement of the content-related information may be changed according to the requested category (S50), and the content-related information may be displayed according to the changed arrangement (S60).

That is, the controller 170 may display the content-related information on a display 180 after changing the arrangement of the content-related information based on the requested category when displaying the content-related information. As described above, when the display device 100 changes the arrangement of content-related information based on the category requested by the user and displays the content-related information, since it is highly likely that the information desired by the user is displayed preferentially, the information desired by the user may be more quickly and accurately provided.

When the requested category is not acquired, the controller 170 may arrange the content-related information according to a default order to display the content-related information on the display 180.

Next, with reference to FIGS. 6 to 23, a method for operating the display device 100 described with reference to FIG. 5 and an example thereof will be described in detail.

FIG. 6 is a schematic view illustrating an example of a method for acquiring a required category and content-related information through a display device according to an embodiment of the present disclosure.

The NLP server 10 may be a natural language processing server. The NLP server 10 may analyze voice data to determine an user's intention. For example, the NLP server 10 may analyze the voice data to determine a category requested by the user.

The metadata server 40 may store and manage content-related information for each content. The metadata server 40 may provide the content related information to the display device 100. For example, when the display device 100 transmits the content information to the metadata server 40, the metadata server 40 may extract the content-related information according to the content information to transmit the content-related information to the display device 100.

Thus, when the display device 100 receives a user's voice command requesting the content-related information, the voice data including the voice command may be transmitted to the NLP server 10 and receive the category requested in the voice command to the NLP server 10.

When the display device 100 receives a user's voice command requesting the content-related information, the display device 100 may acquire content information at a time point at which the voice command is received.

In this case, the content information may include at least one of a content ID for identifying a content, a playback time corresponding to the time point at which the voice command is received, or a content capture image at the time point at which the voice command is received.

When the display device 100 transmits the above-described content information to the metadata server 40, the metadata server 40 may acquire content-related information based on the content information to transmit the content-related information to the display device 100. The display device 100 may receive the content related information in response to the content information from the metadata server 40. The content-related information may be metadata.

The display device 100 may compare the time point at which the content information (e.g., the captured image) is acquired according to the voice command and the time point at which the requested category appears. When the content-related information at the time point at which the content information (e.g., the captured image) is acquired according to the voice command includes the information corresponding to the requested category, the display device 100 may change the alignment of the content-related information according to the requested category.

Figure 7:
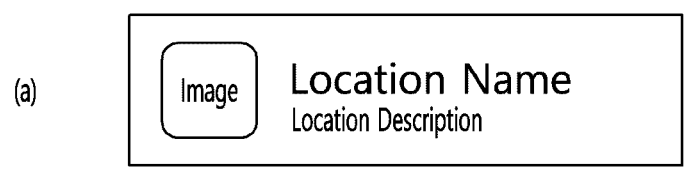
FIG. 7 is a view illustrating an example of a method for displaying content-related information for each category through the display device according to an embodiment of the present disclosure.
Figure 7:
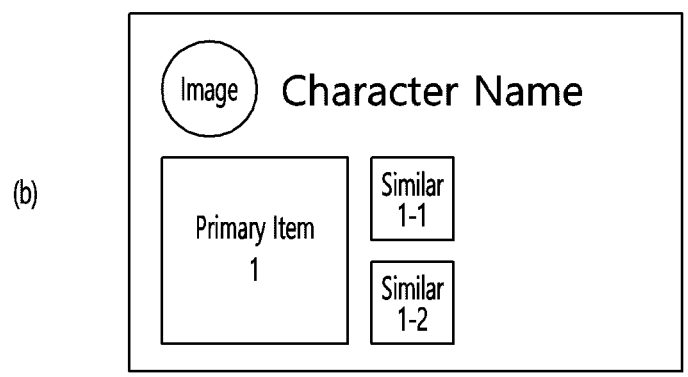
Figure 7:
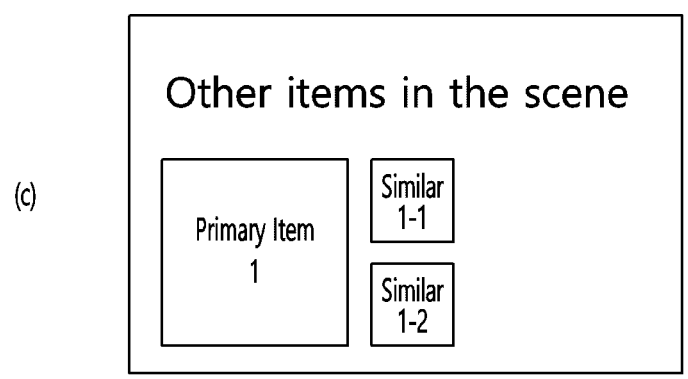

FIG. 7 is a view illustrating an example of a method for displaying content-related information for each category through the display device according to an embodiment of the present disclosure.

(a) of FIG. 7 is an example of a form in which content-related information corresponding to a location category is displayed, and (b) of FIG. 7 is an example of a form in which content-related information corresponding to a product category including a character is displayed, and (c) of FIG. 7 is an example of a form in which content-related information corresponding to a product category, which does not include the character, is displayed. That is, the product category may include or may not include a character. Hereinafter, for convenience of explanation, it is assumed that 'product and character categories' means a product category including the character, and 'product category' means a product category that does not include the character.

As illustrated in (a) of FIG. 7, when the category is a location, the controller 170 may control the display 180 to display content-related information including at least one of a location image, a location name, and a location description, and as illustrated in (b) of FIG. 7, when the category is a product including a character, the controller 170 may control the display 180 so that content-related information including at least one of a character image, a character name, an item worn by the character, or an item similar to the item worn by the character is displayed. As illustrated in (c) of FIG. 7, when the category is a product, the controller 170 may control the display 180 so that content-related information including at least one of an item included in the scene or an item similar to the item included in the scene is displayed.

Content-related information may be generated for each character as information corresponding to product and character categories.

The controller 170 may control the display 180 to preferentially display content-related information corresponding to a requested category when displaying the content-related information. For example, when the requested category is the location, the controller 170 may control the display 180 so that the content-related information illustrated in (a) of FIG. 7 is preferentially displayed rather than the content-related information illustrated in (b) of FIG. 7 or the content-related information illustrated in (c) of FIG. 7.

Figure 8:
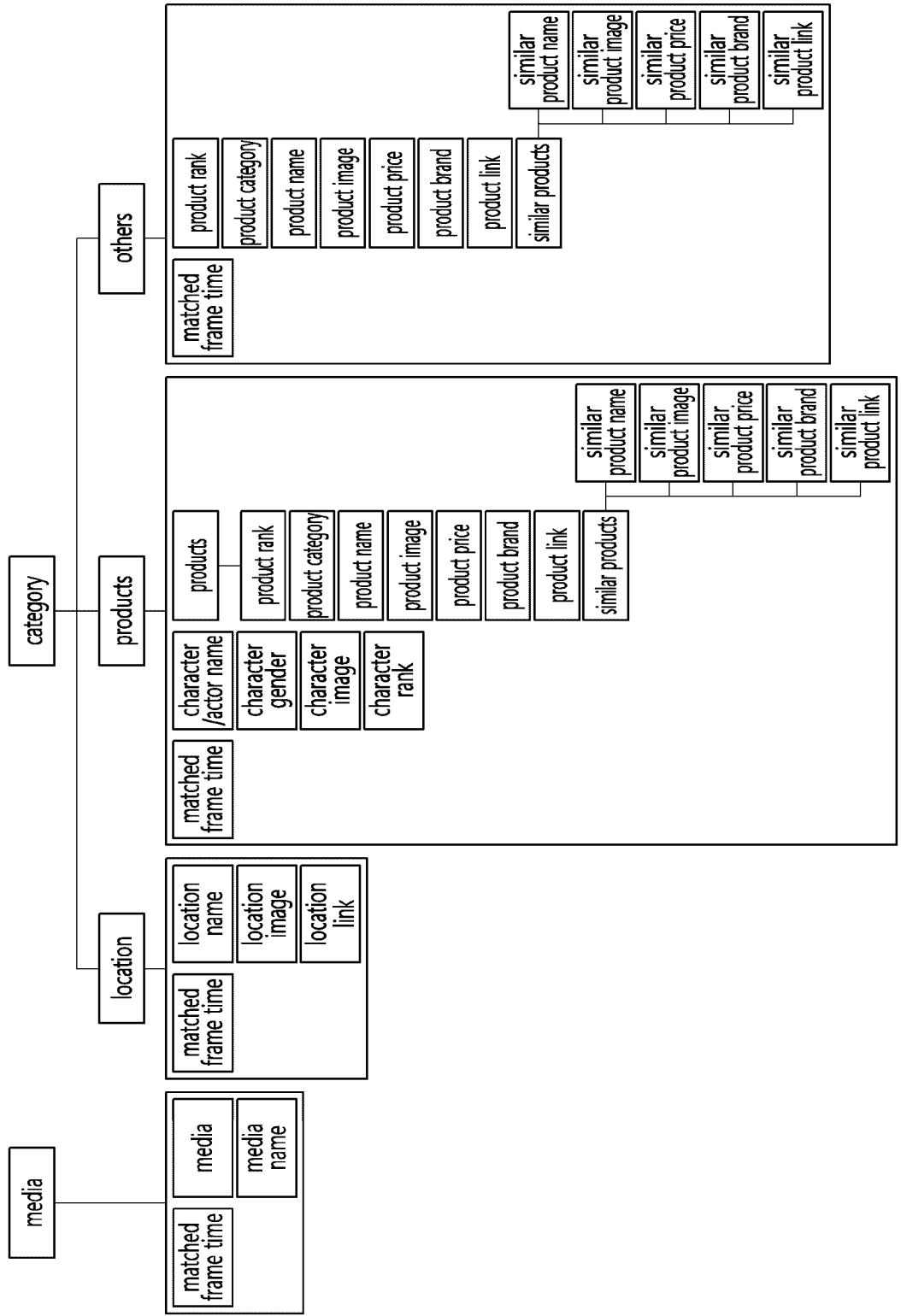
FIG. 8 is a view illustrating an example of a structure of the content-related information according to an embodiment of the present disclosure.

FIG. 8 is a view illustrating an example of a structure of the content-related information according to an embodiment of the present disclosure.

FIG. 8 is a view illustrating an example of content-related information that is metadata, and the content-related information may include content information and a category.

The content information (media) may include a media id, a media name, etc. corresponding to each frame time for each of a plurality of frames constituting the content. The media id may be a content ID, and the media name may be a content name.

The category may include a location, a product, and others. In addition, the category may further include a character. That is, the category may include at least one of a location, a product, a character, or others.

According to an example, the character category may exist separately from the location category, product category, and other categories. According to another example, the character category may be included in the product category. In this case, the product category may include or may not include the character category.

The location may include a location name, a location image, and a location link corresponding to each frame time for each of a plurality of frames constituting the content.

The product may include character/actor names, a character gender, a character image, and a character rank corresponding to each frame time for each of the plurality of frames constituting the content. In addition, each of the characters/actor names may include a product rank, a product category, a product name, a product image, a product price, a product brand, a product link, a similar product, and the similar product may include a similar product name, a similar product image, a similar product price, a similar product brand, and a similar product link.

For example, the product category may include a 'clothing' category, a 'shoes' category, and a 'jewelry' category.

Others may include a product rank, a product category, a product name, a product image, a product price, a product brand, a product link, and a similar product corresponding to each frame time for each of the plurality of frames constituting the content, and the similar product may include a similar product name, a similar product image, a similar product price, a similar product brand, and a similar product link.

That is, the content-related information may include categories corresponding to the frame time for each of the plurality of frames constituting the content. That is, the content-related information that is metadata may be categorized.

The controller 170 may more easily acquire content-related information corresponding to a scene at a time point, at which the voice command is received, by using the content-related information having the structure illustrated in FIG. 8. For example, the controller 170 may acquire a playback time of the content corresponding to the time point, at which the voice command is received, and acquire information about a location, a product, and others, which correspond to the frame time that matches the playback time of the content.

Then, the controller 170 may acquire information corresponding to the requested category by using the content-related information having a structure as shown in FIG. 8. For example, the controller 170 may acquire information corresponding to the requested category by extracting information that matches the information corresponding to the requested category from the content-related information having the structure illustrated in FIG. 8.

When the information corresponding to the requested category is acquired, the controller 170 may display the content-related information after changing the arrangement of the content-related information so that the information corresponding to the requested category is displayed preferentially rather than other information.

Next, an example of a method for changing the arrangement of the content-related information by the display device 100 according to an embodiment of the present disclosure will be described with reference to FIG. 9.

Figure 9:
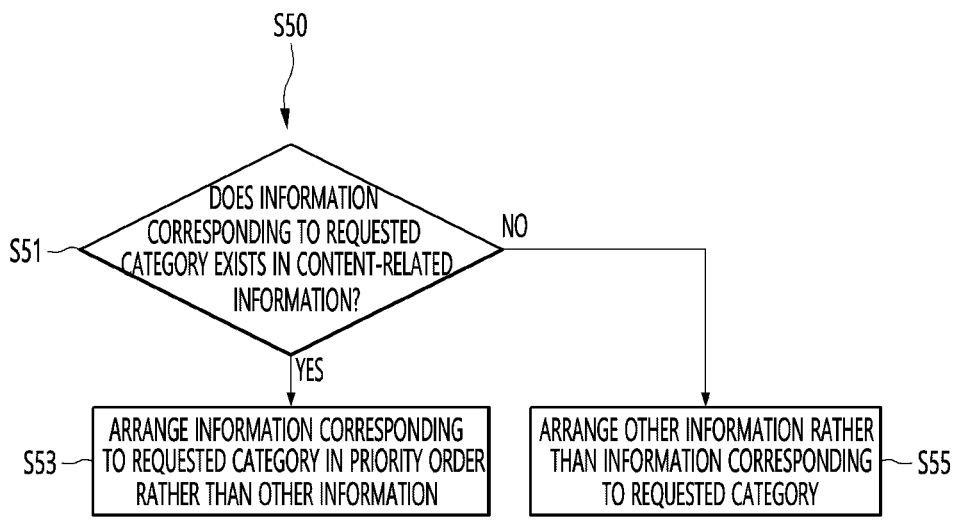
FIG. 9 is a flowchart illustrating an example of a method for changing an arrangement of the content-related information through the display device according to an embodiment of the present disclosure.

FIG. 9 is a flowchart illustrating an example of a method for changing an arrangement of the content-related information through the display device according to an embodiment of the present disclosure.

Particularly, FIG. 9 may be a flowchart in which an operation S50 of FIG. 5 is embodied.

The controller 170 may determine whether information corresponding to the requested category exists in the content-related information (S51).

Specifically, the controller 170 may detect a frame time corresponding to the content playback time at a time point, at which the voice command is received, and search information corresponding to the requested category among the categories corresponding to the frame time detected in the content-related information. If the information corresponding to the requested category is not searched from the content-related information, the controller 170 may determine that the information corresponding to the requested category does not exist in the content-related information, and if the information corresponding to the requested category is searched from the content-related information, the controller 170 may determine that the information corresponding to the requested category exists in the content-related information.

If the information corresponding to the requested category exists in the content-related information, the controller 170 may arrange the information corresponding to the requested category in priority order rather than other information (S53).

In this case, the other information may be information that does not correspond to the requested category.

The controller 170 may arrange information corresponding to the requested category in priority order rather than the information that does not correspond to the requested category.

According to an embodiment, the controller 170 may arrange the content-related information so that the information corresponding to the requested category is located in priority order rather than the information that does not correspond to the requested category. For example, when the content-related information includes information corresponding to a first category and information corresponding to a second category, if the requested category is the first category, the display 180 may display the information corresponding to the first category in priority order rather than the information corresponding to the second category.

According to another embodiment, the controller 170 may arrange the content-related information so that a display size of the information corresponding to the requested category is larger than a display size of the information that does not correspond to the requested category. For example, when the content-related information includes information corresponding to the first category and information corresponding to the second category, if the requested category is the first category, the display 180 may display the information corresponding to the first category having a size greater than that of the information corresponding to the second category.

The above-described method is merely exemplary, and the controller 170 may arrange the information corresponding to the requested category in priority order rather than other information in various manners.

If the information corresponding to the requested category does not exist in the content-related information, the controller 170 may arrange other information in addition to the information corresponding to the requested category (S55).

If the information corresponding to the requested category does not exist in the content-related information, the controller 170 may arrange the content-related information so that other information is displayed.

In this case, the other information may include at least one of that information that does not correspond to the requested category or the information corresponding to the requested category existing in the scene before the time point at which the voice command is received.

Next, an example of a method for arranging information other than that information corresponding to the requested category by the display device 100 according to an embodiment of the present disclosure will be described with reference to FIG. 10.

Figure 10:
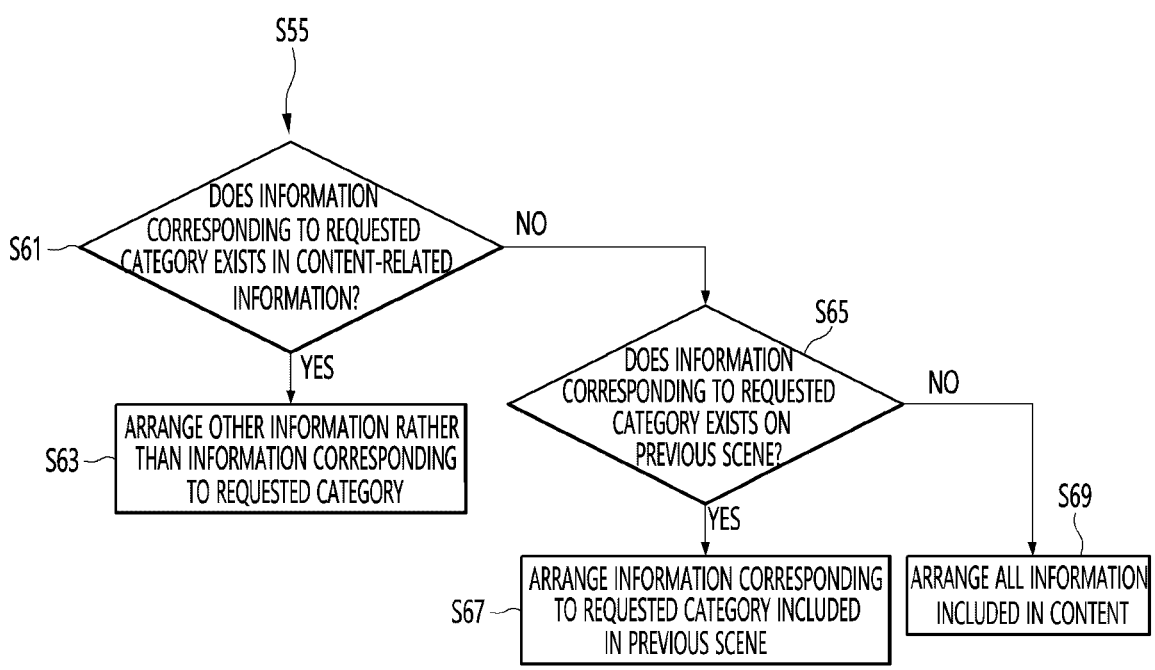
FIG. 10 is a flowchart illustrating an example of a method for arranging other information other than information corresponding to a requested category according to an embodiment of the present disclosure.

FIG. 10 is a flowchart illustrating an example of a method for arranging other information other than information corresponding to a requested category according to an embodiment of the present disclosure.

Particularly, FIG. 10 is a flowchart in which an operation S55 of FIG. 9 is embodied.

The controller 170 may determine whether other information in addition to the information corresponding to the requested category exists (S61).

If the information corresponding to the requested category does not exist in the content-related information, the controller 170 may determine whether other information exists in addition to the information corresponding to the requested category.

If other information exists in addition to the information corresponding to the requested category, the controller 170 may arrange other information in addition to the information corresponding to the requested category (S63).

In this case, the other information may be information corresponding to a category other than the requested category as that information that does not correspond to the requested category. That is, when that information that does not correspond to the requested category exists in addition to that information corresponding to the requested category, the controller 170 may arrange the information that does not correspond to the requested category. That is, when information corresponding to a category other than the requested category exists in the content-related information, the controller 170 may control the display 180 to display information corresponding to the other category.

If there is no other information other than information corresponding to the requested category, the controller 170 may determine whether that information corresponding to the requested category exists in the previous scene (S65).

The previous scene may refer to scenes for a predetermined time before receiving the voice command. For example, the previous scene may refer to scenes for 5 seconds before receiving the voice command. However, in this case, the time of 5 seconds is merely an example, and thus, it is appropriate that the present disclosure is not limited thereto.

Specifically, the controller 170 may detect a frame time corresponding to each of the previous scenes and search information corresponding to a requested category among categories corresponding to the frame times.

Regardless of operation S61, if the information corresponding to the requested category does not exist in the content-related information, it may be determined whether information corresponding to the requested category exists in the scene before receiving the voice command.

If information corresponding to the requested category exists in the previous scene, the controller 170 may arrange information corresponding to the requested category included in the previous scene (S67).

That is, if the information corresponding to the requested category exists in the scene before receiving the voice command, the controller 170 may control the display 180 to display the information corresponding to the requested category included in the previous scene.

However, if there is no information corresponding to the requested category in the previous scene, the controller 170 may arrange all information included in the content (S69).

That is, if there is no information corresponding to the requested category in the previous scene, the controller 170 may arrange the content-related information so that all of the content-related information are displayed.

If the scene at the time point, at which the voice command is received, and the information corresponding to the category requested in the previous scene are not included, the controller 170 may control an entire view mode of the content-related information in which all of the content-related information are displayed.

Regardless of operations S61 and S65, if the information corresponding to the requested category does not exist in the content-related information, the controller 170 may control the display 180 so that all of the content-related information included in the content are displayed.

Figure 11:
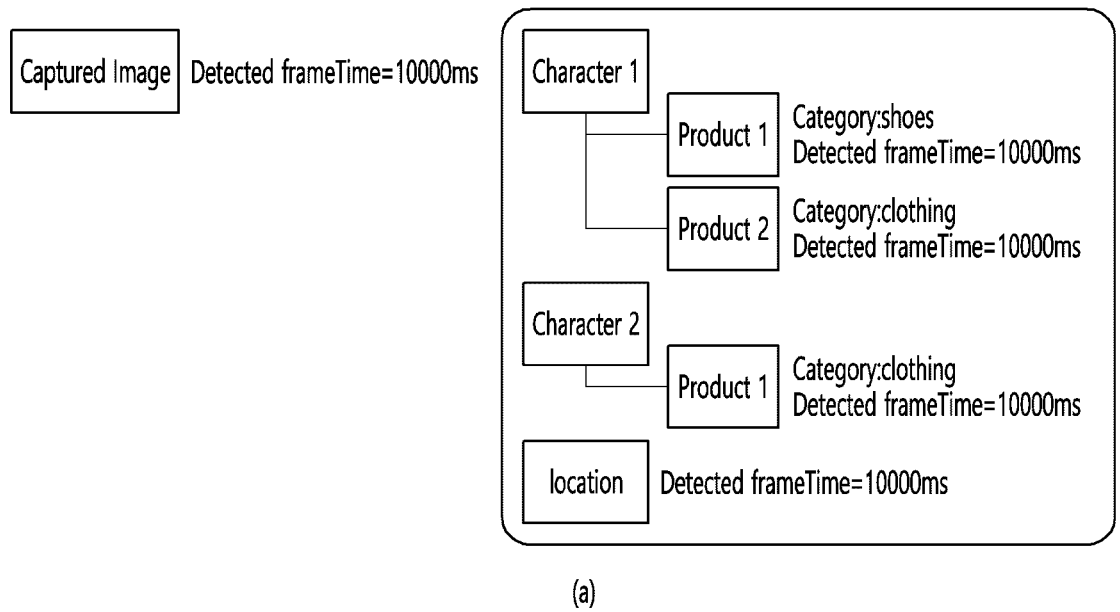
FIG. 11 is a view for explaining a first example of arranging the content-related information through the display device according to an embodiment of the present disclosure.
Figure 11:
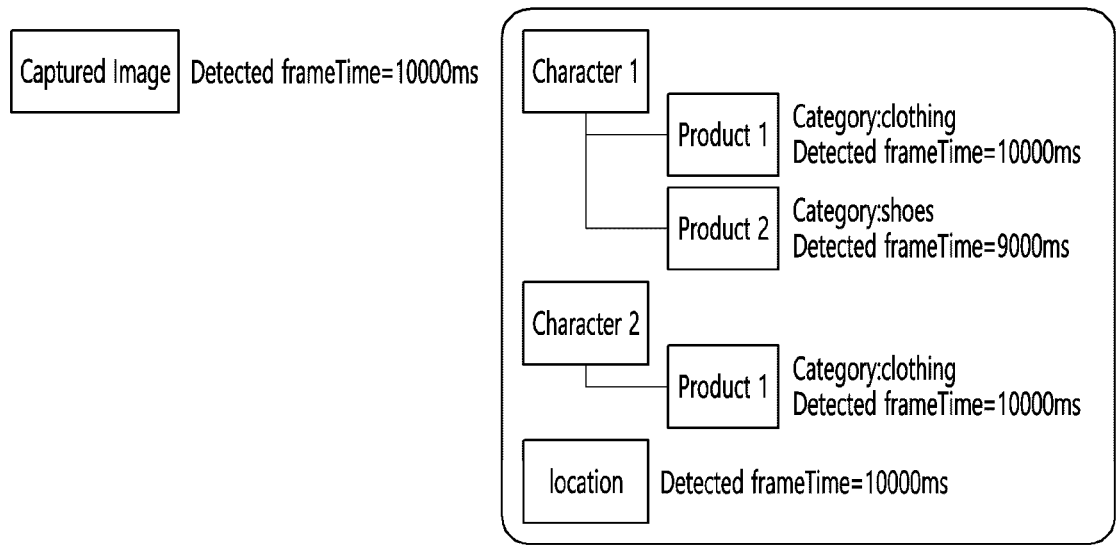

Next, FIG. 11 is a view for explaining a first example of arranging the content-related information through the display device according to an embodiment of the present disclosure.

In the example of FIG. 11, the frame time corresponding to the content playback time at the time point, at which the voice command is received, may be 10,000 ms, and the requested category may be 'shoes'. The controller 170 may search information corresponding to the requested category 'shoes' among categories corresponding to the frame time of 10000 ms.

According to the example illustrated in (a) of FIG. 11, the content-related information may include information on 'Product 1' of 'Character 1' corresponding to the category 'shoes' corresponding to the frame time of 10000 ms. Thus, in this case, the controller 170 may arrange the information on 'Product 1' of 'Character 1' corresponding to the category 'shoes' corresponding to the frame time of 10,000 ms in priority order rather than other information, i.e., information about 'Product 2' of 'Character 1', information on 'Product 1' of 'Character 2', and information on 'location'.

According to the example illustrated in (b) of FIG. 11, the content-related information may not include information corresponding to the category 'shoes' corresponding to the frame time of 10,000 ms. Thus, in this case, the controller 170 may display information on 'Product 1' of 'Character 1' corresponding to another category 'clothing' corresponding to frame time 10,000 ms first and display information on 'Product 2' of the category 'Character 1' corresponding to a frame time 9,000 ms, which is the previous scene and then display information on 'Product 1' of 'Character 2' and information on 'location'.

As described above, the controller 170 may arrange the content-related information so that information preferred by the user is located in the priority order based on the requested category and playback time.

Figure 12:
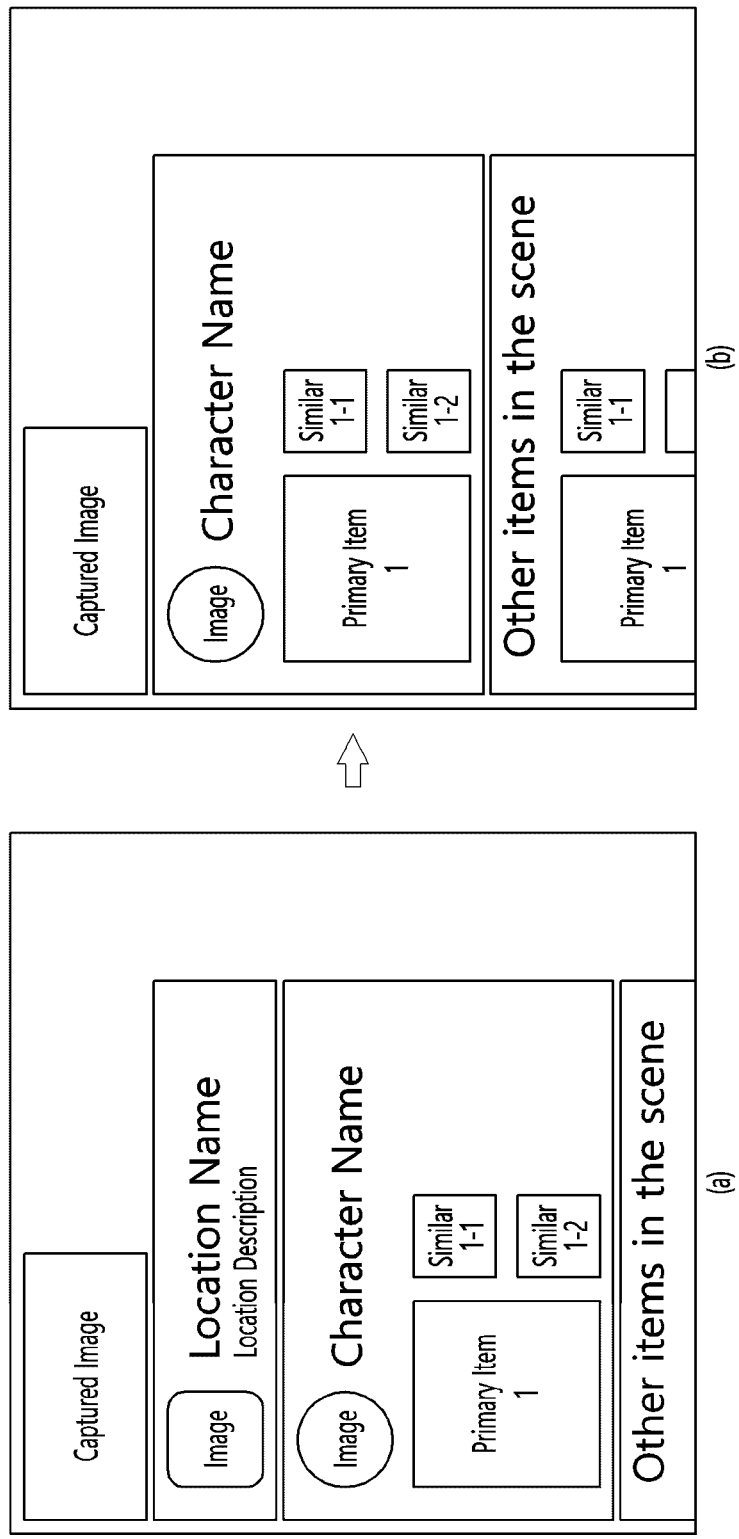
FIG. 12 is a view for explaining a second example of arranging the content-related information through the display device according to an embodiment of the present disclosure.

Next, FIG. 12 is a view for explaining a second example of arranging the content-related information through the display device according to an embodiment of the present disclosure.

The content-related information may be set to be arranged in an order of a location category, product and character categories, and a product category by defaults.

Thus, if there is no requested category, as illustrated in (a) of FIG. 12, the controller 170 may arrange the content-related information so as to be displayed in order of information corresponding to the location category, information corresponding to the product and character categories, and information corresponding to the product category.

When the requested category is a character, as illustrated (b) of FIG. 12, the controller 170 may arrange the content-related information so that the information corresponding to the product and person categories are displayed in priority order rather than the information corresponding to the location category and the information corresponding to the product category.

Figure 13:
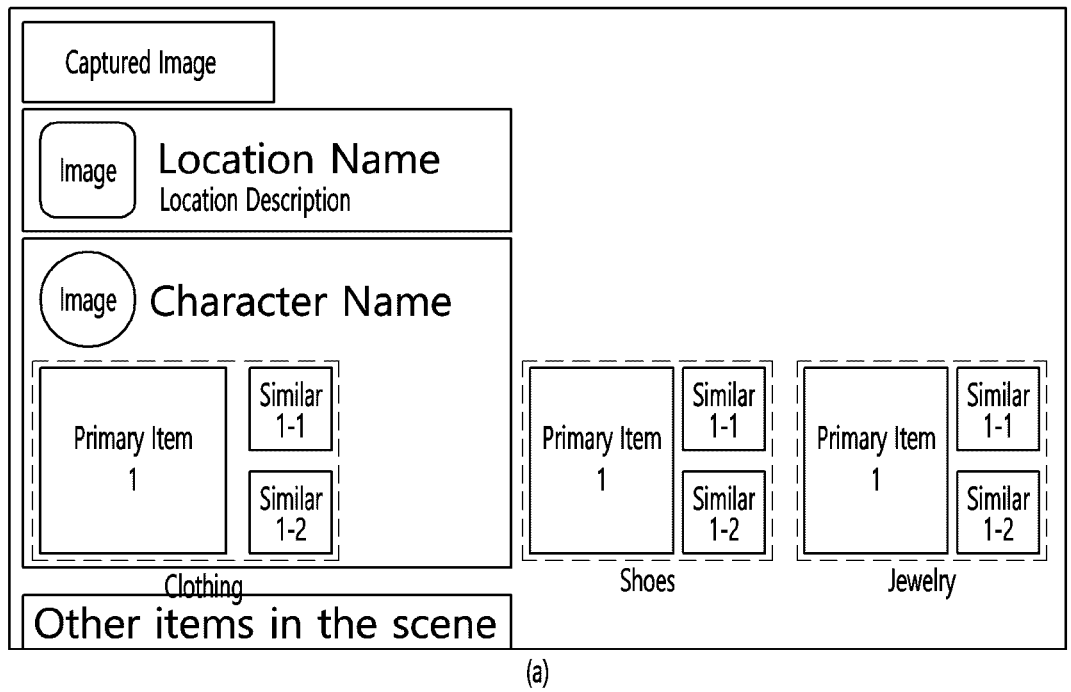
FIG. 13 is a view for explaining a third example of arranging the content-related information through the display device according to an embodiment of the present disclosure.
Figure 13:
Figure 13:
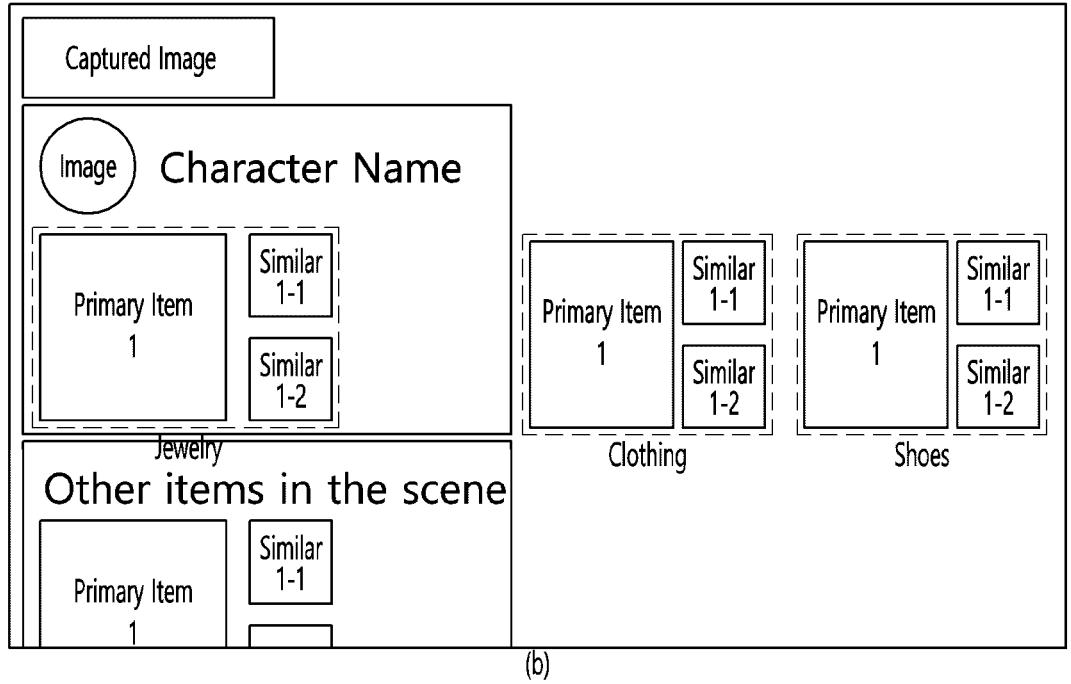

FIG. 13 is a view for explaining a third example of arranging the content-related information through the display device according to an embodiment of the present disclosure.

In the information corresponding to the product and character categories, it may be set to be arranged in order of a 'Clothing' category, a 'Shoes' category, and a 'Jewelry' category by defaults.

Thus, when the requested category may include at least one of 'Product' or 'Fashion', as illustrated in (a) of FIG. 13, the controller 170 may arrange the content-related information so as to be displayed in order of information corresponding to 'Clothing' category, information corresponding to a 'Shoes' category, and information corresponding to a 'Jewelry' category in the information corresponding to the product and character categories. That is, the controller 170 may arrange the content-related information so that the information corresponding to the 'Clothing' category is displayed, and then, the information corresponding to the 'Shoes' category and the information corresponding to the 'Jewelry' category are sequentially displayed whenever each time at which a next command is received, within the information corresponding to the product and character categories. In summary, the controller 170 may change the order of the content-related information displayed in the information corresponding to the product and character categories according to the requested category.

When the voice command is "What is that jewelry?", the controller 170 may acquire 'Product', 'Fashion', and 'Jewelry' as the requested category. In this case, the controller 170 may arrange the content-related information so that the information corresponding to the 'Jewelry' category is displayed in priority order rather than the information corresponding to the 'Clothing' category and the information corresponding to the 'Shoes' category within the information corresponding to the product and character categories. That is, the controller 170 may arrange the content-related information so that the information corresponding to the 'Jewelry' category is displayed, and then, the information corresponding to the 'Clothing' category and the information corresponding to the 'Shoes' category are sequentially displayed whenever each time at which a next command is received, within the information corresponding to the product and character categories.

Next, a method for displaying the content-related information according to the voice command by the display device according to an embodiment of the present disclosure will be described with reference to FIGS. 14 to 23 through various examples.

Figure 14:
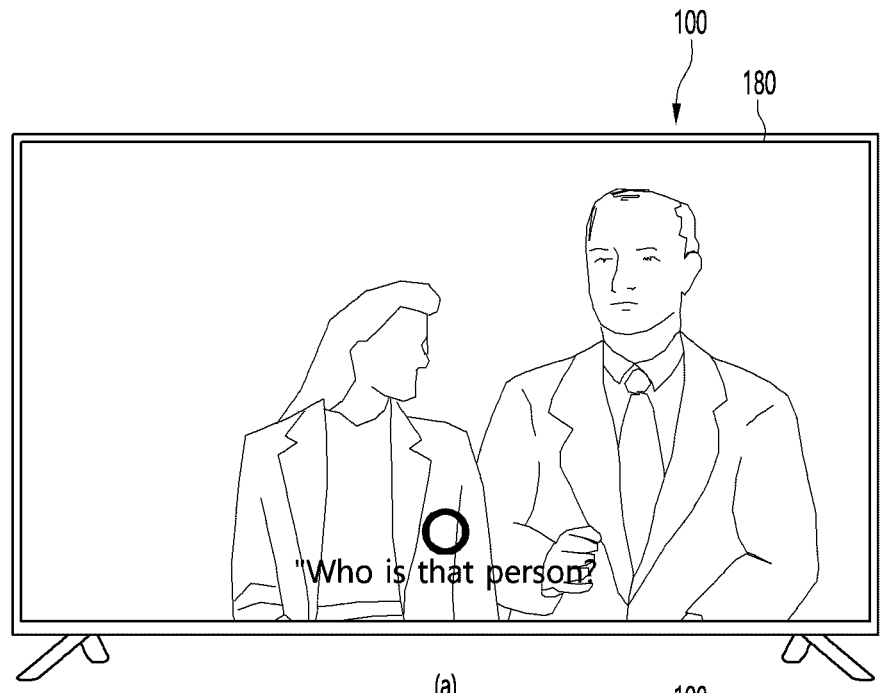
FIG. 14 is a view illustrating a first example of content-related information displayed on a screen according to a voice command through the display device according to an embodiment of the present disclosure.
Figure 14:
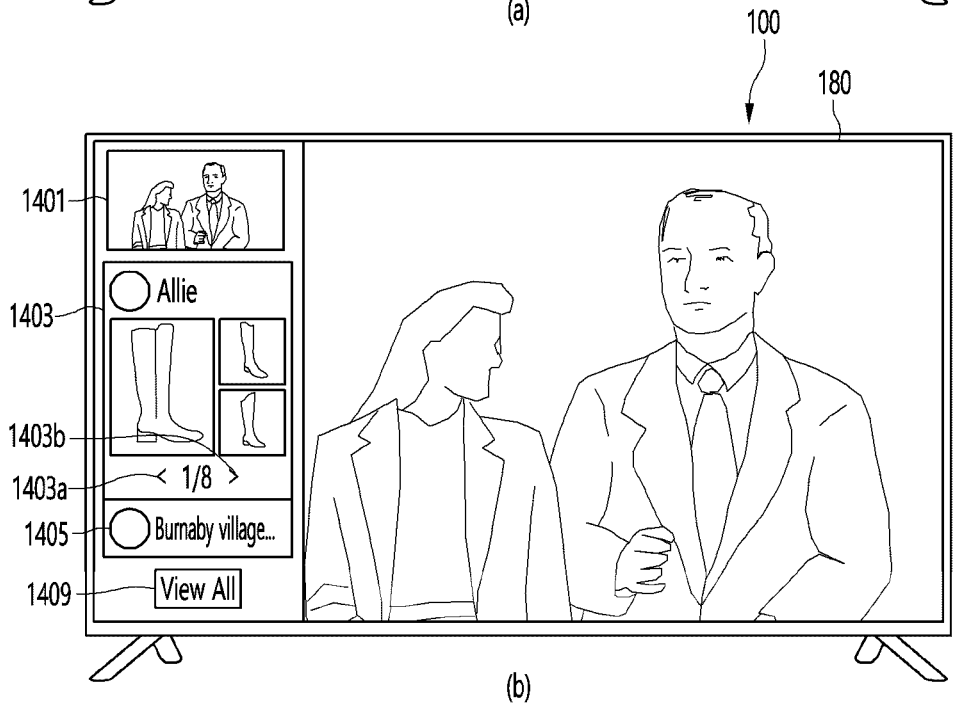

FIG. 14 is a view illustrating a first example of the content-related information displayed on the screen according to the voice command through the display device according to an embodiment of the present disclosure.

As illustrated in (a) of FIG. 14, the controller 170 may receive "Who is that characters?" as the voice command. The controller 170 may acquire a captured image by capturing the screen at the time point, at which the voice command is received.

The controller 170 may acquire the requested category based on the voice command. For example, the controller 170 may acquire 'character/actor' as a requested category based on the voice command.

In addition, the controller 170 may acquire content-related information based on the captured image. The controller 170 may display the content-related information on the display 180. Here, the content-related information may be arranged according to the requested category.

An example illustrated in (b) of FIG. 14 may be an example of a screen on which the content-related information is displayed together with a captured image 1401 through the display 180.

The captured image 1401 may be a video image captured when the voice command is received. Through the captured image 1401, there is an advantage that the user easily checks which scene the content-related information is related to the content-related information.

Also, in the example of FIG. 14, the content-related information corresponding to the captured image 1401 may include information 1403 corresponding to product and character categories and information 1405 corresponding to a location category.

In this case, the display 180 may display the information 1403 corresponding to the product and character categories in priority order rather than the information 1405 corresponding to the location category based on the requested category.

The information 1403 corresponding to the product and character categories may include information about a product worn by a character appearing in the content and information about a product similar to that worn by the character.

The information 1403 corresponding to the product and character categories may be different for each character. For example, when the character appearing in the content is a first character and a second characters, information corresponding to the product and character categories for the first character and information corresponding to the product and character categories for the second character may separately exist.

The information 1403 corresponding to the product and character categories may include a previous view icon 1403a and a next view icon 1403b. The previous view icon 1403a and the next view icon 1403b may be icons for switching to display a product other than the displayed product when the information corresponding to product and character categories includes a plurality of products.

The information 1405 corresponding to the location category may include information about a location appearing in the content. Particularly, the information 1405 corresponding to the location category may include information about a location appearing in the captured image 1401.

In addition, the display 180 may further display an entire view icon 1409. The entire view icon 1409 may be an icon for displaying all of the content-related information included in the currently displayed content.

Thus, there is an advantage that the user preferentially checks the requested information.

Figure 15:
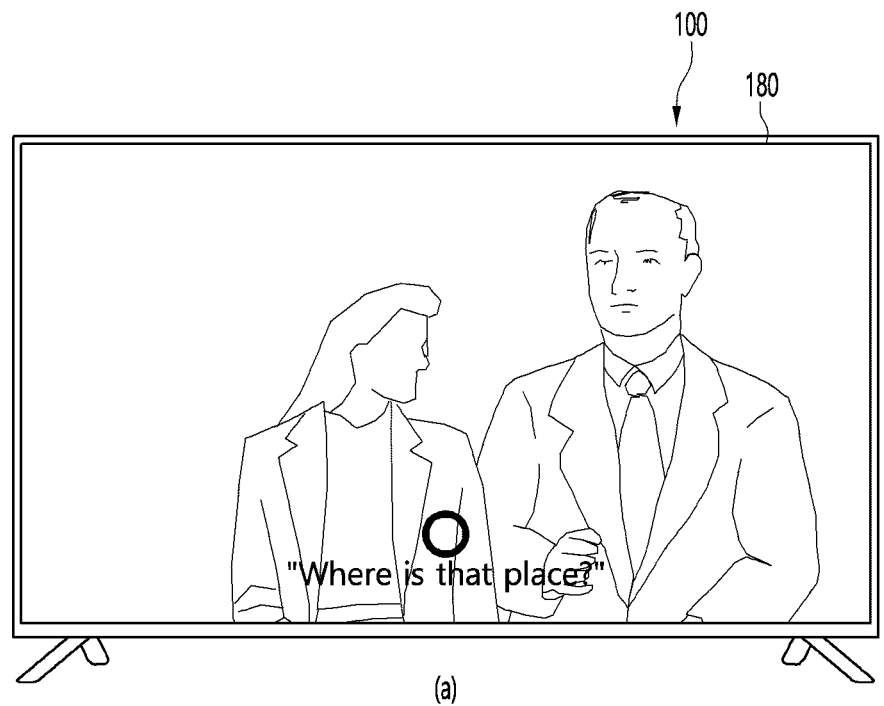
FIG. 15 is a view illustrating a second example of content-related information displayed on the screen according to the voice command through the display device according to an embodiment of the present disclosure.
Figure 15:
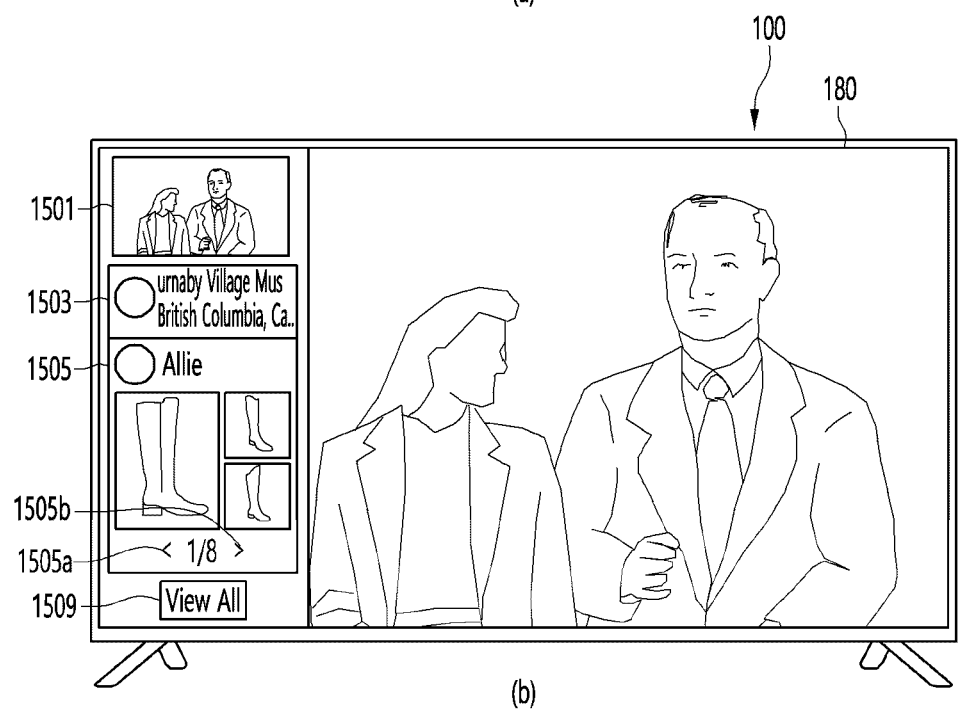

FIG. 15 is a view illustrating a second example of content-related information displayed on the screen according to the voice command through the display device according to an embodiment of the present disclosure.

As illustrated in (a) of FIG. 15, the controller 170 may receive "Where is that location?" as the voice command. The controller 170 may acquire a captured image by capturing the screen at the time point, at which the voice command is received.

The controller 170 may acquire the requested category based on the voice command. For example, the controller 170 may acquire 'location' as a requested category based on the voice command.

In addition, the controller 170 may acquire content-related information based on the captured image. The controller 170 may display the content-related information on the display 180. Here, the content-related information may be arranged according to the requested category.

An example illustrated in (b) of FIG. 15 may be an example of a screen on which the content-related information is displayed together with a captured image 1501 through the display 180.

The captured image 1501 may be a video image captured when the voice command is received. Through the captured image 1501, there is an advantage that the user easily checks which scene the content-related information is related to the content-related information.

Also, in the example of FIG. 15, the content-related information corresponding to the captured image 1501 may include information 1503 corresponding to a location category and information 1505 corresponding to production and character categories.

In this case, the display 180 may display the information 1503 corresponding to the location category in priority order rather than the information 1505 corresponding to the product and character categories.

Similarly, the information 1503 corresponding to the location category may include information about a location appearing in the content. Particularly, the information 1503 corresponding to the location category may include information about a location appearing in the captured image 1501.

The information 1505 corresponding to the product and character categories may include information about a product worn by a character appearing in the content and information about a product similar to that worn by the character.

The information 1505 corresponding to the product and character categories may include a previous view icon 1505a and a next view icon 1505b. The previous view icon 1505a and the next view icon 1505b may be icons for switching information to display a product other than the displayed product when the information corresponding to product and character categories includes a plurality of products.

In addition, the display 180 may further display an entire view icon 1509. The entire view icon 1509 may be an icon for displaying all of the content-related information included in the currently displayed content.

Thus, there is an advantage that the user preferentially checks the requested information.

Figure 16:
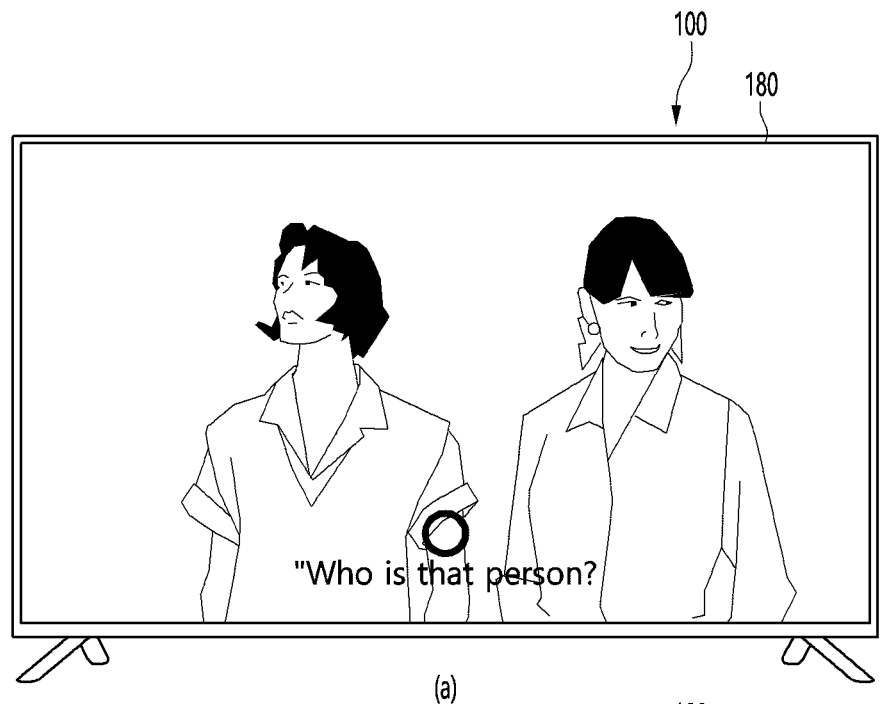
FIG. 16 is a view illustrating a third example of content-related information displayed on the screen according to the voice command through the display device according to an embodiment of the present disclosure.
Figure 16:
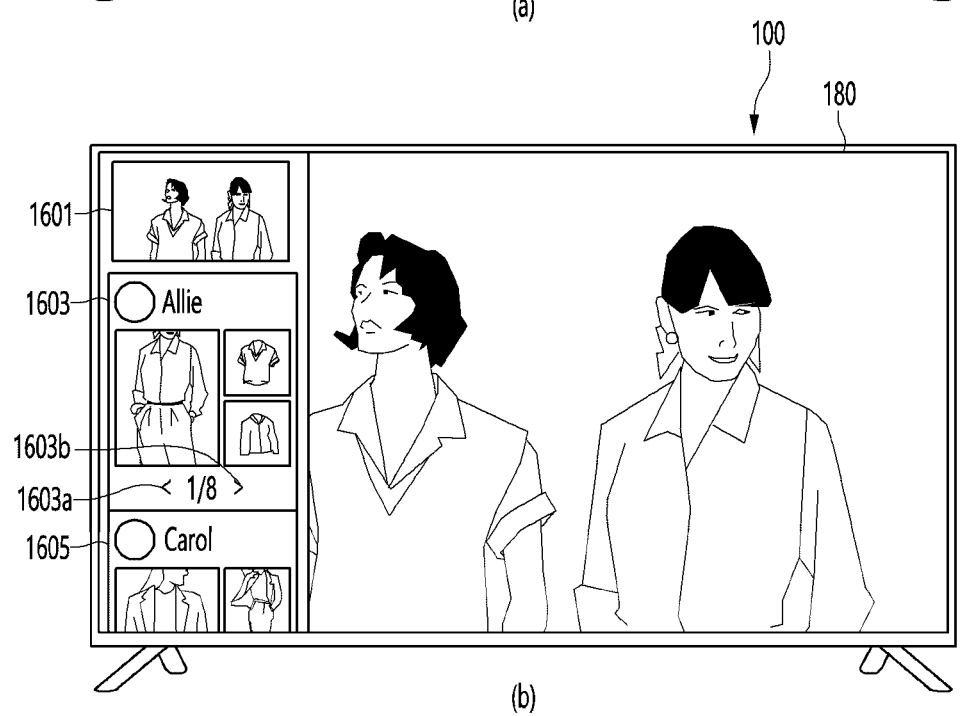

FIG. 16 is a view illustrating a third example of content-related information displayed on the screen according to the voice command through the display device according to an embodiment of the present disclosure.

As illustrated in (a) of FIG. 16, the controller 170 may receive "Who is that characters?" as the voice command. The controller 170 may acquire a captured image by capturing the screen at the time point, at which the voice command is received.

The controller 170 may acquire the requested category based on the voice command. For example, the controller 170 may acquire 'character/actor' as a requested category based on the voice command.

In addition, the controller 170 may acquire content-related information based on the captured image. The controller 170 may display the content-related information on the display 180. Here, the content-related information may be arranged according to the requested category.

An example illustrated in (b) of FIG. 16 may be an example of a screen on which the content-related information is displayed together with a captured image 1601 through the display 180.

The captured image 1601 may be a video image captured when the voice command is received. Through the captured image 1601, there is an advantage that the user easily checks which scene the content-related information is related to the content-related information.

Also, in the example of FIG. 16, the content-related information corresponding to the captured image 1601 may include information 1603 corresponding to product and character categories on the first character and information 1605 corresponding to product and character categories on the second character.

In this case, the display 180 may display any one of the information 1603 corresponding to the product and character categories for the first character and the information 1605 corresponding to the product and character categories for the second character in priority order rather than the other based on the requested category.

Whether the information corresponding to the product and character categories for which one of the first character and the second character is displayed first may be determined according to a character rank among the categories. In the example of FIG. 16, it is assumed that the information 1603 corresponding to the product and character category for the first character is displayed in priority order rather than the information 1605 corresponding to the product and character categories for the second character.

Each of the pieces of information 1603 and 1605 corresponding to the product and character categories for the first and second characters may include information on products worn by the character appearing in the content and information on products similar to those worn by the character.

The information 1603 corresponding to the product and character categories of the first character and the information 1605 corresponding to the product and character categories of the second character may be different from each other.

In the information 1603 corresponding to the product and character categories for the first character, there may be a plurality of pieces of information of the 'product' category related to the first character. In this case, the controller 170 may arrange the content-related information so that the information of the 'Clothing' category among the plurality of 'product' categories related to the first character is displayed preferentially. That is, when the requested category includes only the 'product' category, the controller 170 may determine the order of information belonging to the 'product' category according to defaults.

In addition, the information 1603 corresponding to the product and character categories of the first character may include a previous view icon 1603a and a next view icon 1603b. The previous view icon 1603a and the next view icon 1603*b* may be icons for switching information of the plurality of 'product' categories to be sequentially displayed.

When the controller 170 displays the information 1605 corresponding to the product and character categories for the second character, in similar to the information 1603 corresponding to the product and character categories for the first character, the order of the pieces of information belonging to the 'product' category may be determined and include the previous view icon (not shown) and the next view icon (not shown).

Figure 17:
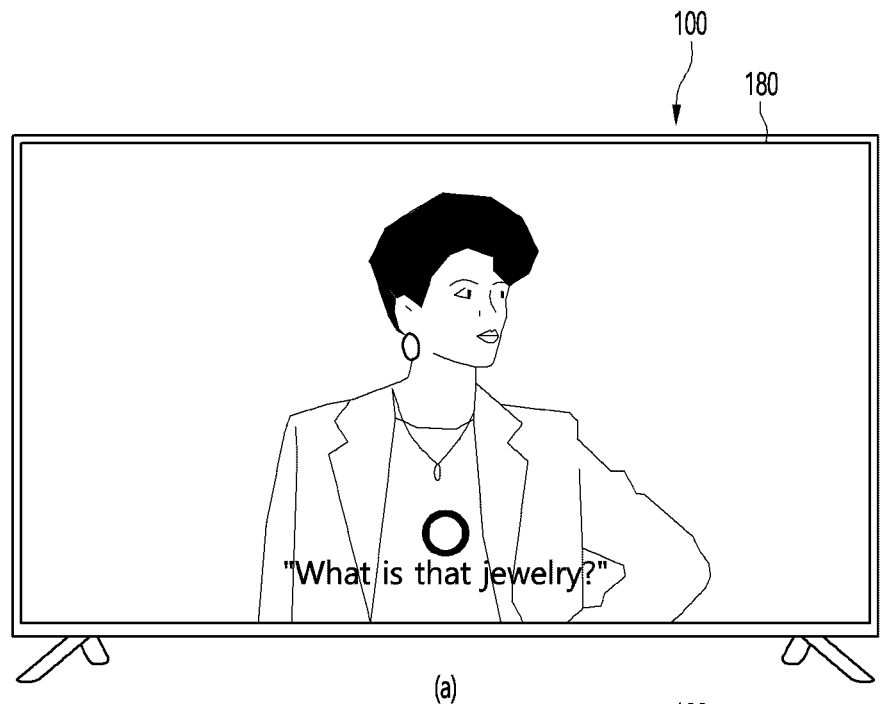
FIG. 17 is a view illustrating a fourth example of content-related information displayed on the screen according to the voice command through the display device according to an embodiment of the present disclosure.
Figure 17:
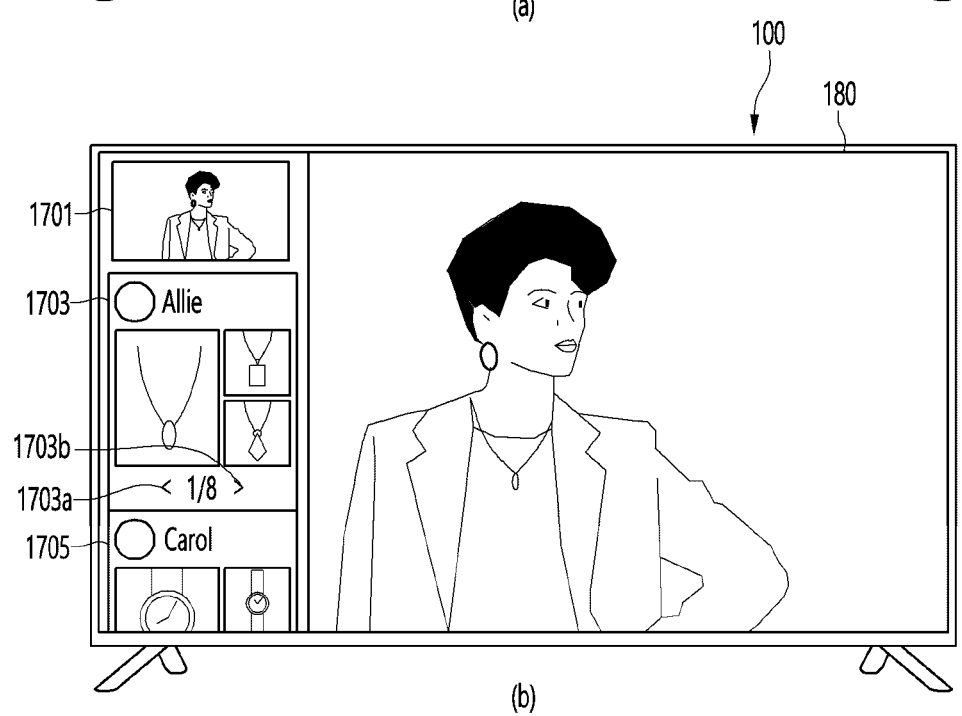

FIG. 17 is a view illustrating a fourth example of content-related information displayed on the screen according to the voice command through the display device according to an embodiment of the present disclosure.

As illustrated in (a) of FIG. 17, the controller 170 may receive "What is that jewelry?" as the voice command. The controller 170 may acquire a captured image by capturing the screen at the time point, at which the voice command is received.

The controller 170 may acquire the requested category based on the voice command. For example, the controller 170 may acquire at least one of 'Product', 'Fashion', or 'Jewelry' as the requested category based on the voice command.

In addition, the controller 170 may acquire content-related information based on the captured image. The controller 170 may display the content-related information on the display 180. Here, the content-related information may be arranged according to the requested category.

An example illustrated in (b) of FIG. 17 may be an example of a screen on which the content-related information is displayed together with a captured image 1701 through the display 180.

The captured image 1701 may be a video image captured when the voice command is received. Through the captured image 1701, there is an advantage that the user easily checks which scene the content-related information is related to the content-related information.

Also, in the example of FIG. 17, the content-related information corresponding to the captured image 1701 may include information 1703 corresponding to product and character categories on the first character and information 1705 corresponding to product and character categories on the second character.

In this case, the display 180 may display any one of the information 1703 corresponding to the product and character categories for the first character and the information 1705 corresponding to the product and character categories for the second character in priority order rather than the other based on the requested category. Similarly to FIG. 16, in the example of FIG. 16, it is assumed that the information 1703 corresponding to the product and character category for the first character is displayed in priority order rather than the information 1705 corresponding to the product and character categories for the second character.

Each of the pieces of information 1703 and 1705 corresponding to the product and character categories for the first and second characters may include information on products worn by the character appearing in the content and information on products similar to those worn by the character.

The information 1703 corresponding to the product and character categories of the first character and the information 1705 corresponding to the product and character categories of the second character may be different from each other.

In the information 1703 corresponding to the product and character categories for the first character, there may be a plurality of pieces of information of the 'product' category related to the first character. In this case, the controller 170 may arrange the content-related information so that the information of the 'Jewelry' category among the plurality of 'product' categories related to the first character is displayed preferentially. That is, since the requested category includes the 'Jewelry' category, the controller 170 may arrange the content-related information so that the information corresponding to the 'Jewelry' category among information belonging to the 'product' category is displayed first according to the requested category.

In addition, the information 1703 corresponding to the product and character categories of the first character may include a previous view icon 1703*a* and a next view icon 1703*b*. The previous view icon 1703*a* and the next view icon 1703*b* may be icons for switching information of the plurality of 'product' categories to be sequentially displayed. For example, when the controller 170 receives a command for selecting the next view icon 1703*b* while the information corresponding to the 'Jewelry' category is displayed, the controller 170 may control the display 180 so that other information belonging to the 'product' category is displayed.

Similarly, when the controller 170 displays the information 1705 corresponding to the product and character categories for the second character, in similar to the information 1703 corresponding to the product and character categories for the first character, the controller 170 may arrange the content-related information so that the information corresponding to the 'Jewelry' category is displayed in priority order rather than the pieces of other information and include the previous view icon (not shown) and the next view icon (not shown).

Figure 18:
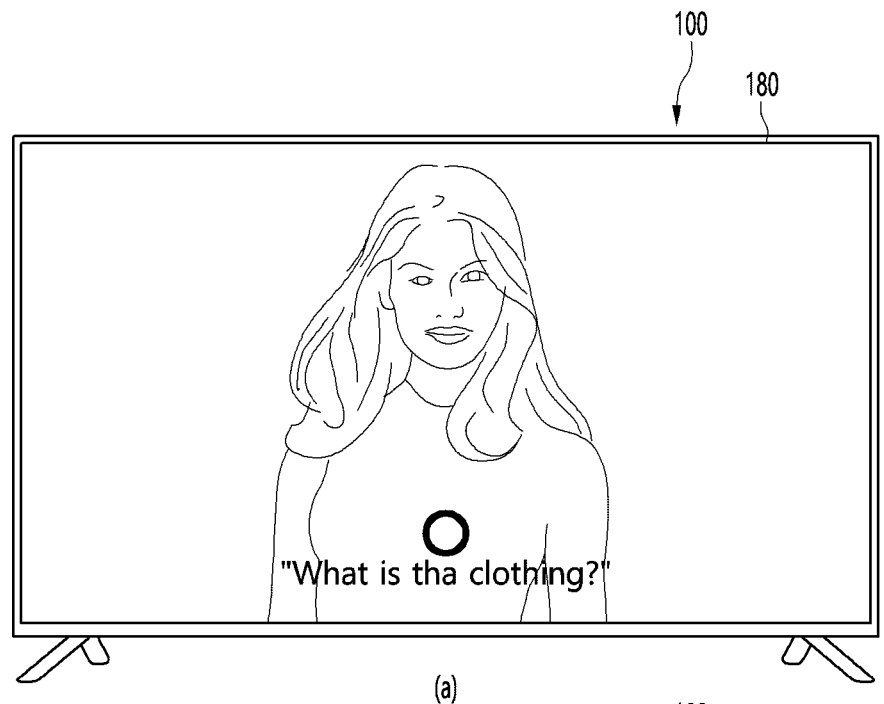
FIG. 18 is a view illustrating a fifth example of content-related information displayed on the screen according to the voice command through the display device according to an embodiment of the present disclosure.
Figure 18:
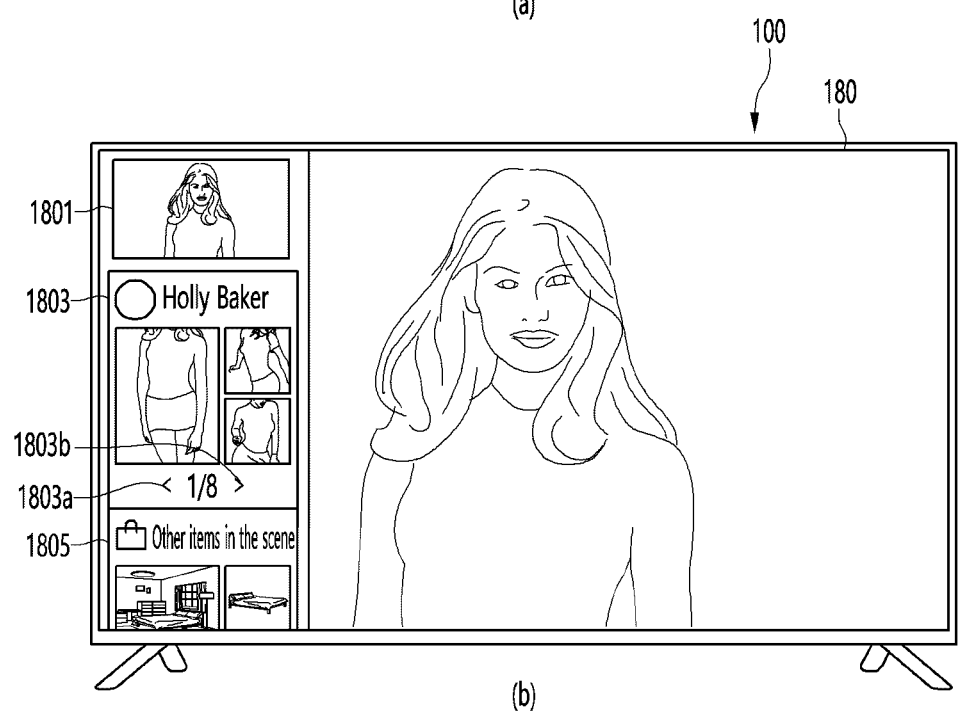

FIG. 18 is a view illustrating a fifth example of content-related information displayed on the screen according to the voice command through the display device according to an embodiment of the present disclosure.

As illustrated in (a) of FIG. 18, the controller 170 may receive "What is that clothing?" as the voice command. The controller 170 may acquire a captured image by capturing the screen at the time point, at which the voice command is received.

The controller 170 may acquire the requested category based on the voice command. For example, the controller 170 may acquire at least one of 'Product', 'Fashion', or 'Clothing' as the requested category based on the voice command.

In addition, the controller 170 may acquire content-related information based on the captured image. The controller 170 may display the content-related information on the display 180. Here, the content-related information may be arranged according to the requested category.

An example illustrated in (b) of FIG. 18 may be an example of a screen on which the content-related information is displayed together with a captured image 1801 through the display 180.

The captured image 1801 may be a video image captured when the voice command is received. Through the captured image 1801, there is an advantage that the user easily checks which scene the content-related information is related to the content-related information.

Also, in the example of FIG. 18, the content-related information corresponding to the captured image 1801 may include information 1803 corresponding to product and character categories on the first character and information 1805 corresponding to a product category. The information 1803 corresponding to the product and character categories of the first character may include a previous view icon 1803*a* and a next view icon 1803*b*.

In this case, the information 1803 corresponding to the product and character categories for the first character may include information corresponding to the 'Fashion' category, and the information 1805 corresponding to the product category may include information corresponding to 'others' categories. In this case, the display 180 may display the information 1803 corresponding to the product and character categories for the first character in priority order rather than the information 1805 corresponding to the product category based on the requested category.

However, unlike the example of FIG. 18, when the controller 170 receives "What is that furniture?" as the voice command, at least one of 'others' or 'furniture' may be acquired as the requested category.

In this case, the display 180 may display the information 1805 corresponding to the product category in priority order rather than the information 1803 corresponding to the product and character categories for the first character based on the requested category.

Figure 19:
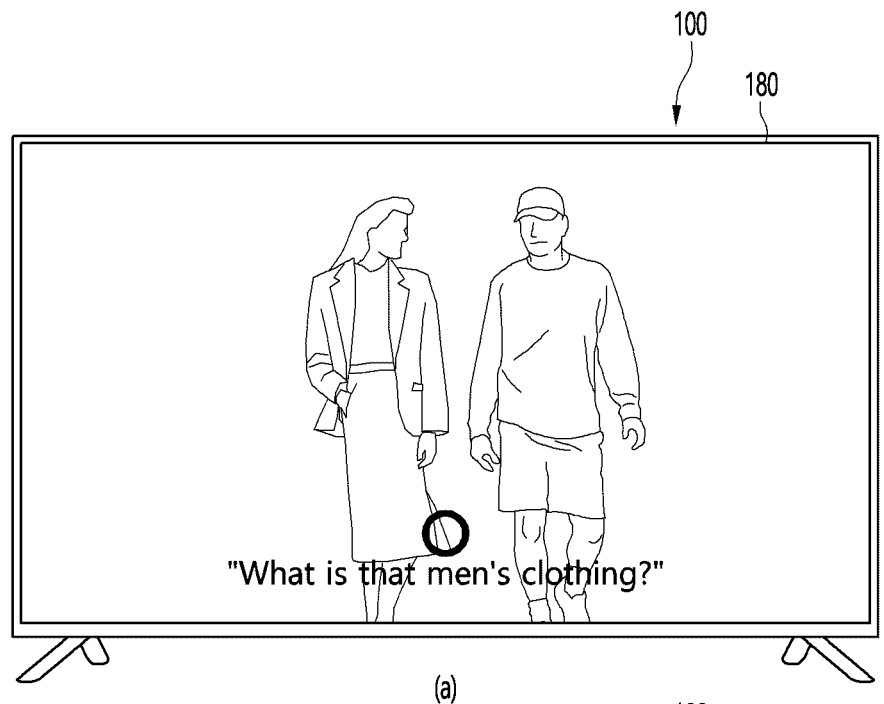
FIGS. 19 and 20 are views illustrating a sixth example of content-related information displayed on the screen according to the voice command through the display device according to an embodiment of the present disclosure.
Figure 19:
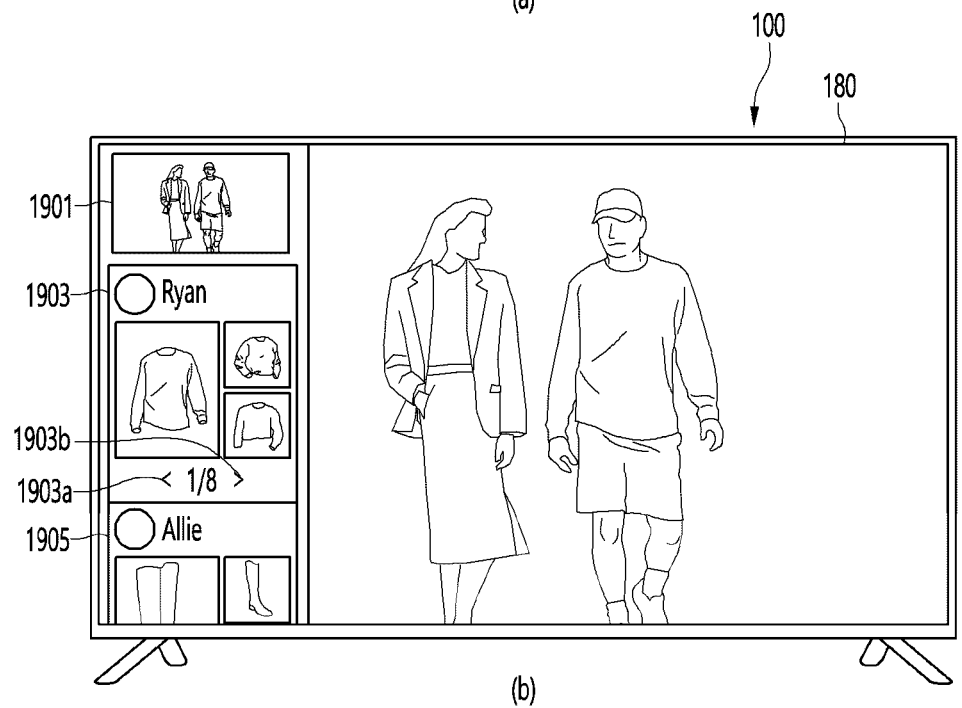
Figure 20:
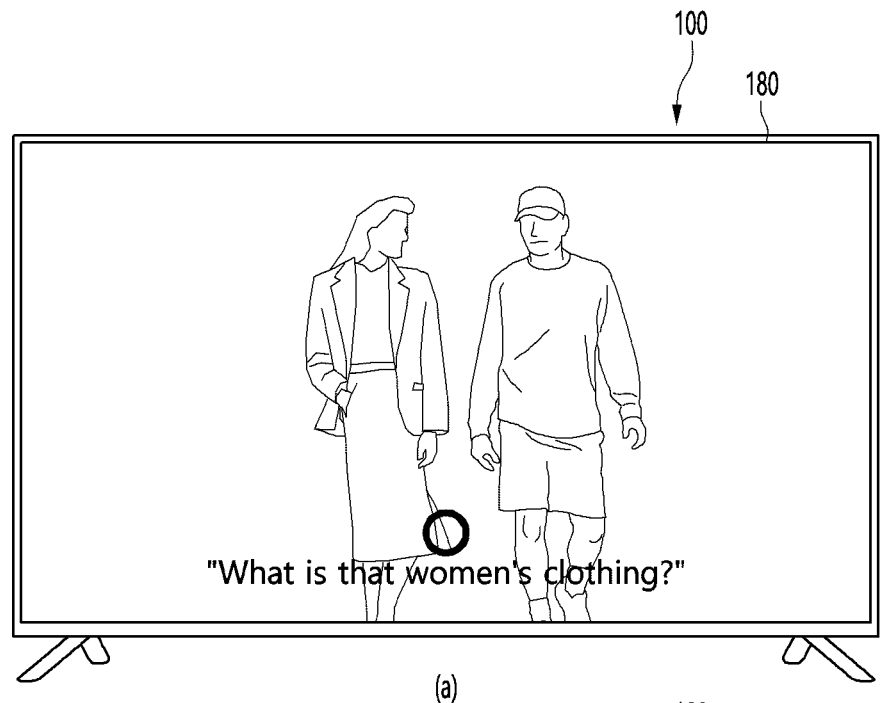
Figure 20:
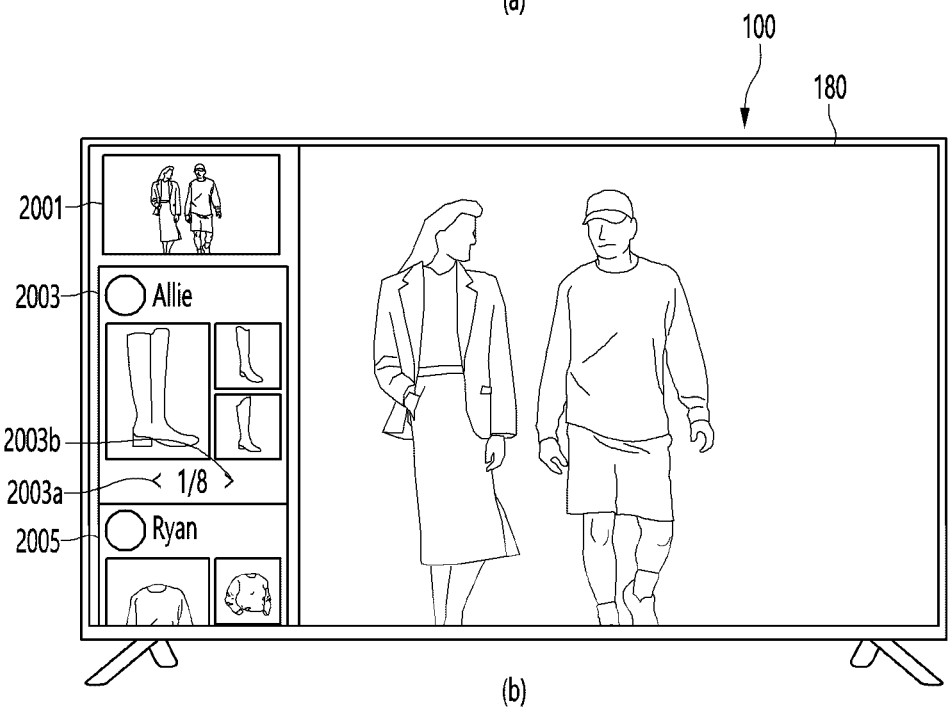

FIGS. 19 and 20 are views illustrating a sixth example of content-related information displayed on the screen according to the voice command through the display device according to an embodiment of the present disclosure.

As illustrated in (a) of FIG. 19, the controller 170 may receive "What is that men's clothing?" as the voice command. The controller 170 may acquire a captured image by capturing the screen at the time point, at which the voice command is received.

The controller 170 may acquire the requested category based on the voice command. For example, the controller 170 may acquire at least one of 'Product', 'Fashion', 'Clothing', or 'men' as the requested category based on the voice command.

In addition, the controller 170 may acquire content-related information based on the captured image. The controller 170 may display the content-related information on the display 180. Here, the content-related information may be arranged according to the requested category.

An example illustrated in (b) of FIG. 19 may be an example of a screen on which the content-related information is displayed together with a captured image 1901 through the display 180.

The captured image 1901 may be a video image captured when the voice command is received. Through the captured image 1901, there is an advantage that the user easily checks which scene the content-related information is related to the content-related information.

Also, in the example of FIG. 19, the content-related information corresponding to the captured image 1901 may include information 1903 corresponding to product and character categories on the first character and information 1905 corresponding to product and character categories on the second character. In this case, the information 1903 corresponding to the product and character categories for the first character may include a 'men' category, and the information 1905 corresponding to the product and character categories for the second character may include a 'woman' category. In this case, the display 180 may display the information 1903 corresponding to the product and character categories for the first character and the information 1905 corresponding to the product and character categories for the second character in priority order based on the requested category.

As illustrated in FIG. 20, the controller 170 may receive "What is that women's clothing?" as the voice command. For example, the controller 170 may acquire at least one of 'Product', 'Fashion', 'Clothing', or 'women' as the requested category based on the voice command.

In this case, the controller 170 may arrange the content-related information so that the information 1905 corresponding to the product and character categories for the second character including the 'women' category is displayed in priority order rather than the information 1903 corresponding to the product and character categories for the first character including the 'men' category.

Figure 21:
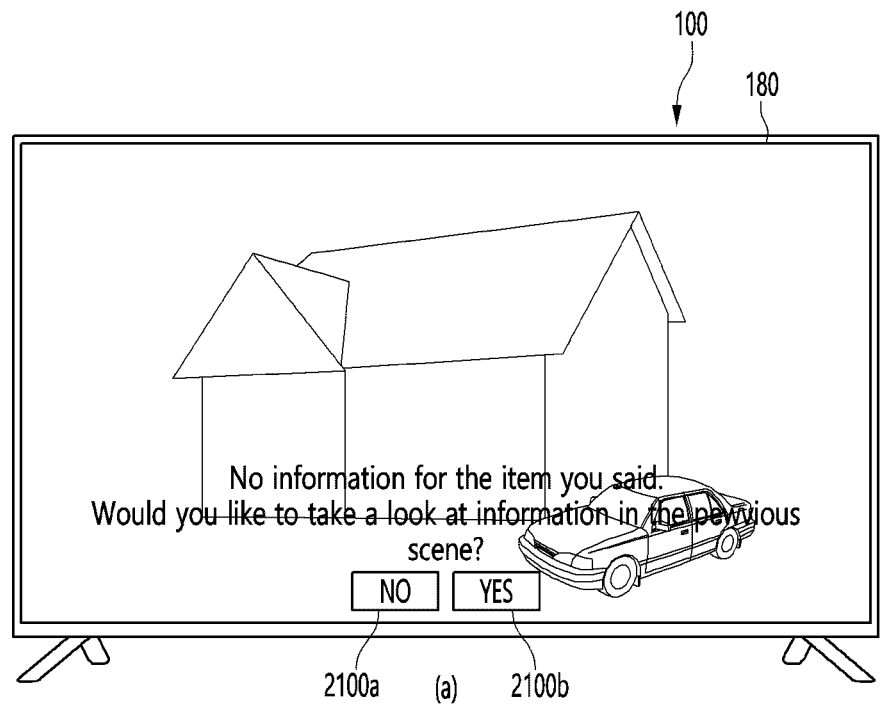
FIG. 21 is a view illustrating a seventh example of content-related information displayed on the screen according to the voice command through the display device according to an embodiment of the present disclosure.
Figure 21:
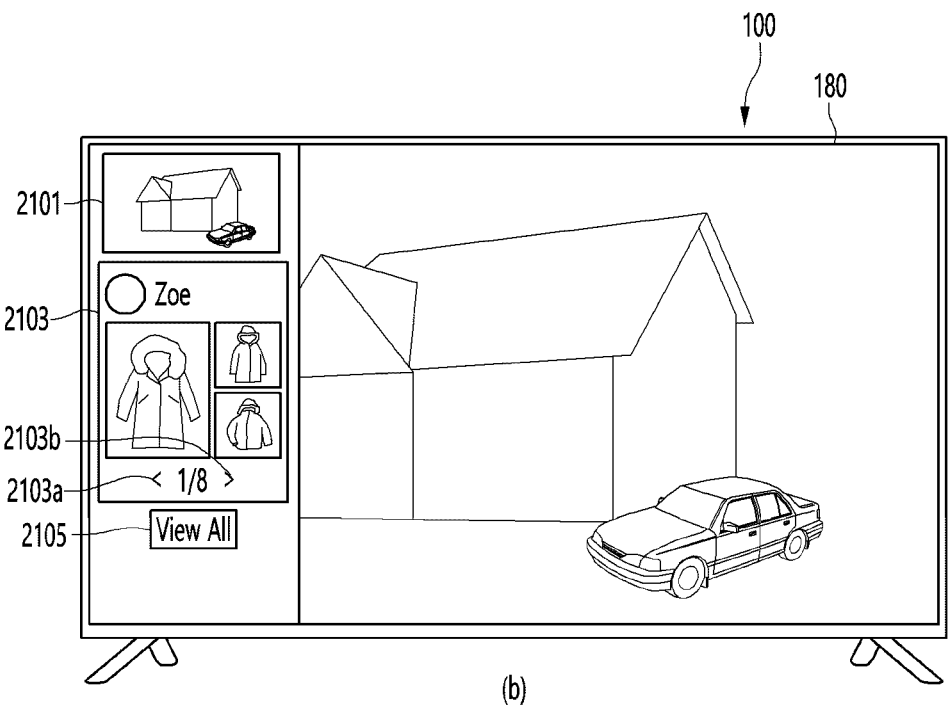

FIG. 21 is a view illustrating a seventh example of content-related information displayed on the screen according to the voice command through the display device according to an embodiment of the present disclosure.

The controller 170 may acquire the requested category according to the voice command, but the information corresponding to the requested category may not exist in the content-related information. In this case, the display 180 may display a message indicating that there is no information corresponding to the requested category. For example, as illustrated in (a) of FIG. 21, the display 180 may display a message such as "No information for the item you said".

Then, the controller 170 may control the display 180 to further display a message that asks whether to confirm the information contained in the previous scene in addition to the message indicating that there is no information corresponding to the requested category, a no icon 2100a, and a yes icon 2100

For example, the display 180 may display a message such as "Would you like to take a look at information in the previous scene?"

When receiving a selection command of the no icon 2100a, the controller 170 may not display the content-related information.

However, when receiving the selection command of the yes icon 2100b, the controller 170 may acquire the information corresponding to the category requested in the previous scene. Particularly, the controller 170 may extract a scene having the information corresponding to the requested category from among the previous scenes. If there are a plurality of scenes having the information corresponding to the requested category among the previous scenes, the controller 170 may extract one scene closest to a time point, at which the voice command is received, from among the plurality of scenes. The controller 170 may display the content related information included in the previously extracted scene as described above.

For example, as illustrated in (b) of FIG. 21, the controller 170 may display a captured image 2101 of the previous scene, information 2103 corresponding to product and character categories included in the previous scene, and an entire view icon 2105.

In this case, it is possible to minimize a problem in which information desired by the user is not displayed as user utters a bit late, and thus, there is an advantage in that information desired by the user is more accurately provided.

According to an embodiment, when the information corresponding to the requested category does not exist in the content-related information, the controller 170 omits the screen illustrated in (a) of FIG. 21 and immediately may display a screen as illustrated in (b) of FIG. 21.

Figure 22:
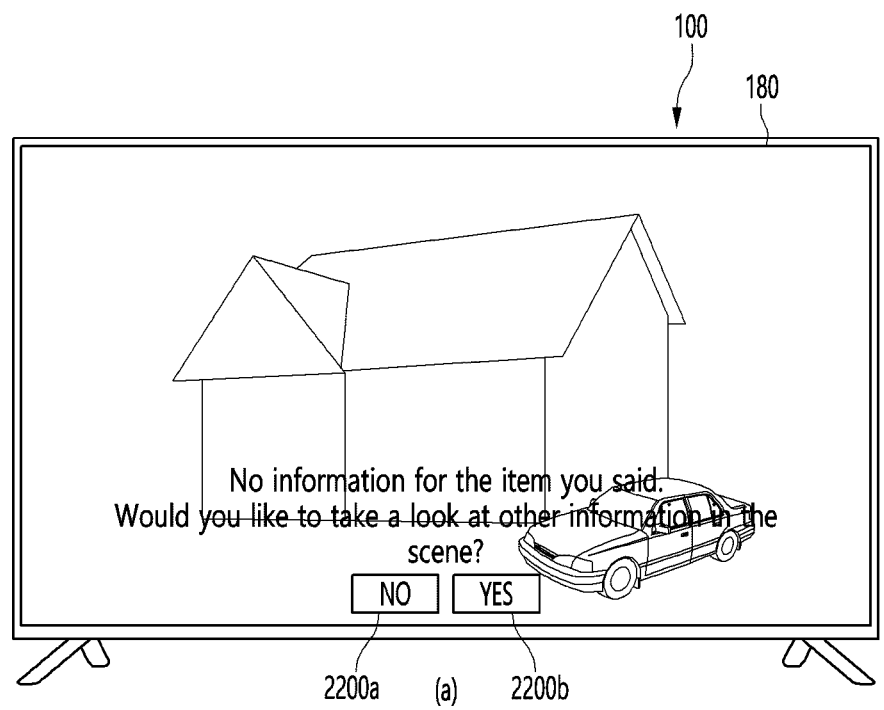
FIG. 22 is a view illustrating an eighth example of content-related information displayed on the screen according to the voice command through the display device according to an embodiment of the present disclosure.
Figure 22:
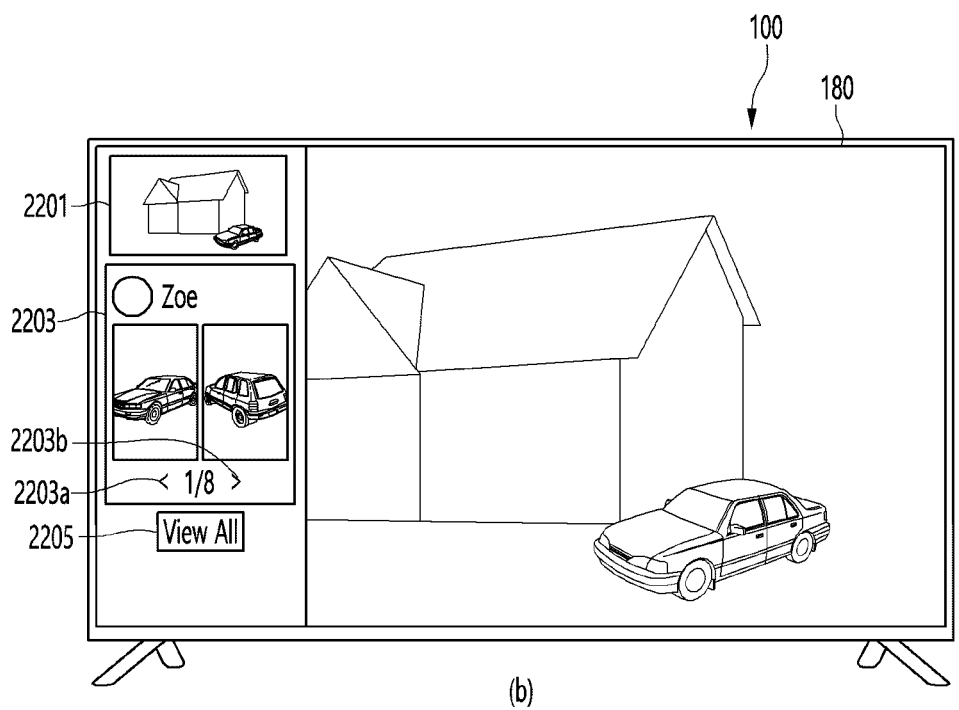

FIG. 22 is a view illustrating an eighth example of content-related information displayed on the screen according to the voice command through the display device according to an embodiment of the present disclosure.

The controller 170 may acquire the requested category according to the voice command, but the information corresponding to the requested category may not exist in the content-related information. In this case, the display 180 may display a message indicating that there is no information corresponding to the requested category. For example, as illustrated in (a) of FIG. 22, the display 180 may display a message such as "No information for the item you said".

Then, the controller 170 may control the display 180 to further display a message that asks wither to confirm the information contained in the current scene in addition to the message indicating that there is no information corresponding to the requested category, a no icon 2200*a*, and a yes icon 2200*b*.

For example, the display 180 may display a message such as "Would you like to take a look at other information in the scene?"

When receiving a selection command of the no icon 2200*a*, the controller 170 may not display the content-related information.

However, when receiving the selection command of the yes icon 2200*b*, the controller 170 may acquire the information that does not correspond to the category requested in the current scene. The current scene may mean a scene being displayed at the time point at which the voice command is received. The controller 170 may extract information other than the information corresponding to the requested category from among the current scene.

As illustrated in (b) of FIG. 22, the controller 170 may display a captured image 2201 of the current scene, other information 2203 in addition to the information corresponding to the requested category, and an entire view icon 2205.

In this case, it has an advantage of providing a product similar to the product requested by the user instead of providing any information to the user by displaying other information related to the scene that is being watched by the user even though it does not exactly match the category requested by the user.

According to an embodiment, when the information corresponding to the requested category does not exist in the content-related information corresponding to the current scene, the controller 170 omits the screen illustrated in (a) of FIG. 22 and immediately may display a screen as illustrated in (b) of FIG. 22.

Figure 23:
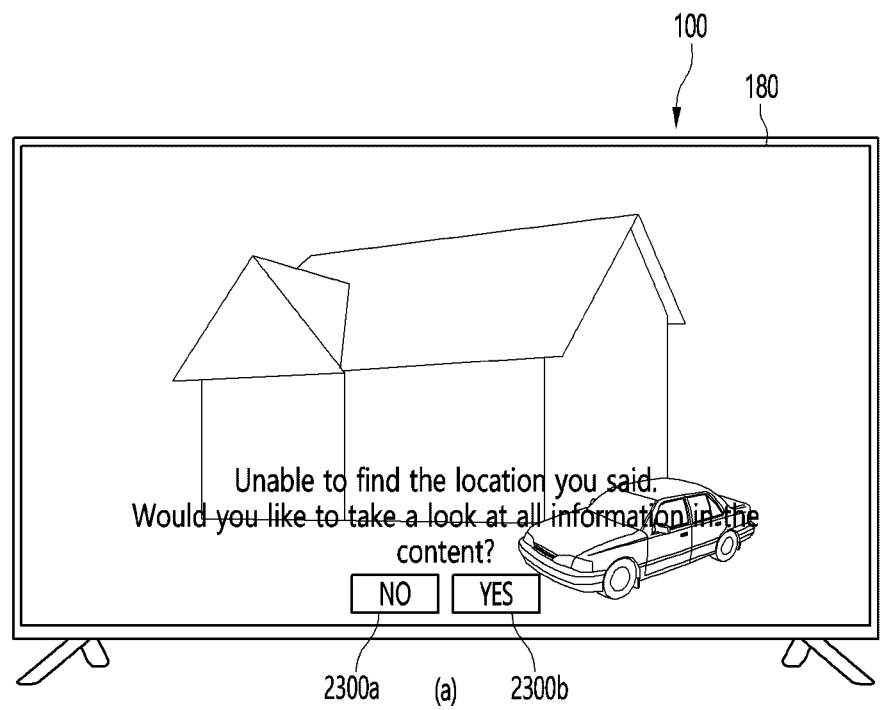
FIG. 23 is a view illustrating a ninth example of content-related information displayed on the screen according to the voice command through the display device according to an embodiment of the present disclosure.
Figure 23:
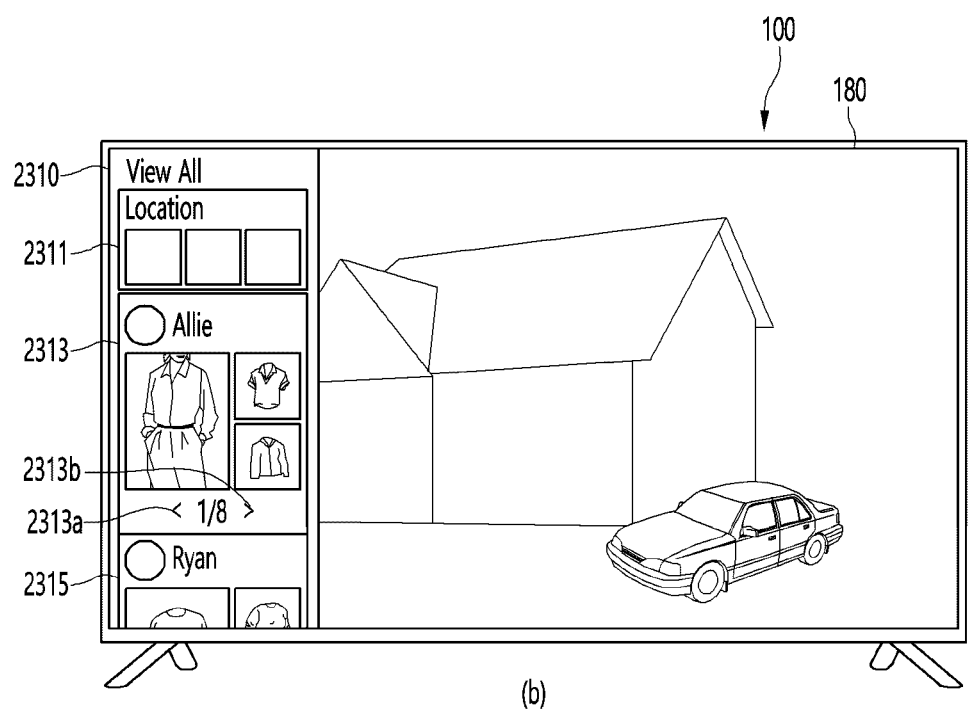

FIG. 23 is a view illustrating a ninth example of content-related information displayed on the screen according to the voice command through the display device according to an embodiment of the present disclosure.

The controller 170 may acquire the requested category according to the voice command, but the information corresponding to the requested category may not exist in the content-related information. In this case, the display 180 may display a message indicating that there is no information corresponding to the requested category. For example, as illustrated in (a) of FIG. 23, the display 180 may display a message such as "No information for the item you said".

Then, the controller 170 may control the display 180 to further display a message that asks whether to execute the entire view in addition to the message indicating that there is no information corresponding to the requested category, a no icon 2300*a*, and a yes icon 2300*b*.

The entire view may be a mode for displaying all content-related information included in the currently viewed image.

For example, the display 180 may display a message such as "Would you like to take a look at all information in the content?".

When receiving a selection command of the no icon 2300*a*, the controller 170 may not display the content-related information.

However, when receiving the selection command of the yes icon 2300*b*, the controller 170 may control the display 180 to display all content-related information included in the currently displayed content.

As illustrated in (b) of FIG. 23, the display 180 may display an entire view menu 2310, and the entire view menu 2310 may include information 2311 corresponding to a location category, information 2313 corresponding to product and character categories for the first character, and information 2315 corresponding to the product and character categories for the second character.

In this case, when the information requested by the user is not searched, a function for directly searching the information desired by the user may be provided.

Unlike described with reference to FIGS. 21 to 23, if the information corresponding to the requested category does not exist in the content-related information, the controller 170 may operate according to the flowchart illustrated in FIG. 10 to control the display 180 so that a screen as illustrated in (b) of FIG. 22 is displayed in operation S63, a screen as illustrated in (b) of FIG. 21 is displayed in operation S67, and a screen as illustrated in (b) of FIG. 23 is displayed in operation S69.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

The invention claimed is:

1. A display device comprising:
   a receiver configured to receive one or more voice commands;
   a display configured to display content; and
   a controller configured to:
   in response to receiving a voice command including a category while displaying a scene, receive a plurality of category information corresponding to the scene and identify first category information from among the plurality of category information that corresponds to the category included in the voice command,
   arrange the first category information to be displayed together with the scene according to a first priority, and
   arrange at least one second category information from among the plurality of category information to be displayed together with the scene according to a second priority lower than the first priority,
   wherein the at least one second category information is displayed together with the first category information and the scene, and the at least one second category information is unrelated to the category included in the voice command, and
   wherein the controller is further configured to:
   in response to receiving the voice command, display a view all icon on a screen, and
   in response to a selection of the view all icon, display all information included in the plurality of category information corresponding to the scene, the all information including character information corresponding to the scene, product information corresponding to the scene, location information corresponding to the scene, and music information corresponding to the scene.

2. The display device according to claim 1, wherein, when the information corresponding to the requested category does not exist among the plurality of category information corresponding to the scene, the controller is configured to control the display so that other information other than the information corresponding to the requested category are displayed.

3. The display device according to claim 1, wherein, when the information corresponding to the requested category does not exist among the plurality of category information corresponding to the scene, the controller is configured to determine whether information corresponding to other categories other than the requested category exist in the content-related information.

4. The display device according to claim 3, wherein, when information corresponding to other categories other than the requested category exists in the content-related information, the controller is configured to control the display so that the information corresponding to the other categories is displayed.

5. The display device according to claim 1, wherein, when the information corresponding to the requested category does not exist among the plurality of category information corresponding to the scene, the controller is configured to determine whether the information corresponding to the requested category exists for a previous scene that was disposed before receiving the voice command.

6. The display device according to claim 5, wherein, when the information corresponding to the requested category exists for the previous scene before receiving the voice command, the controller is configured to control the display so that the information corresponding to the requested category in the previous scene is displayed.

7. The display device according to claim 1, wherein, when the information corresponding to the requested category does not exist among the plurality of category information corresponding to the scene, the controller is configured to control the display so that all content-related information corresponding to the content is displayed.

8. The display device according to claim 1, wherein, when the voice command is received, the controller is configured to acquire content-related information that is metadata including a category.

9. The display device according to claim 1, wherein the category comprises at least one of a location, a product, and a character.

10. The display device according to claim 1, wherein the plurality of category information comprises categories corresponding to a frame time for each of a plurality of frames constituting the content.

11. The display device according to claim 1, wherein, when the plurality of category information is displayed, the controller is configured to control the display so that an image captured at a time point, at which the voice command is received, is further displayed.

12. The display device according to claim 1, wherein the controller is configured to acquire the requested category based on the voice command.

13. The display device according to claim 1, wherein the controller is configured to determine an order in which the content-related information is displayed based on the requested category.

14. The display device according to claim 1, wherein the first category information having the first priority is displayed at a location on the display that is higher than the second category information having the second priority.

15. The display device according to claim 1, wherein the plurality of category information corresponding to the scene are displayed on a left side of a screen, and the scene is displayed on a right side of the screen.

16. The display device according to claim 1, wherein the controller is further configured to:
in response when the information corresponding to the requested category not existing among the plurality of category information corresponding to the scene, display a message overlaid on the scene,
wherein the message indicates that no information is available for the requested category and includes a question asking the user whether to receive other information related to the scene that is different than the requested category.

17. The display device according to claim 1, wherein a no icon and a yes icon are displayed below the question included in the message that is overlaid on the scene.

18. The display device according to claim 17, wherein the controller is further configured to:
in response to receiving a user selection input corresponding to the yes icon, change an arrangement of at least one of the first category information and the second category information to generate rearranged information and displayed the rearranged information together with the scene.

* * * * *